(12) United States Patent
Kraus et al.

(10) Patent No.: US 8,006,816 B2
(45) Date of Patent: Aug. 30, 2011

(54) COMBINATION CYLINDER WITH PAWL-ACTUATED EMERGENCY RELEASE DEVICE FOR THE PARKING BRAKE

(75) Inventors: Harry-Werner Kraus, München (DE); Armin Ostler, München (DE); Erich Fuderer, Fürstenfeldbruck (DE); Michael Mathieu, Puchheim (DE); Christian Ebner, Augsburg (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 12/793,200

(22) Filed: Jun. 3, 2010

(65) Prior Publication Data
US 2010/0294601 A1    Nov. 25, 2010

Related U.S. Application Data

(63) Continuation of application No. 12/745,988, filed as application No. PCT/EP2008/010052 on Nov. 27, 2008.

(30) Foreign Application Priority Data

Dec. 6, 2007    (DE) .......................... 10 2007 058 670

(51) Int. Cl.
  *F16D 65/24*    (2006.01)
  *F16D 55/08*    (2006.01)
(52) U.S. Cl. .......... 188/170; 188/72.6; 188/265; 303/89
(58) Field of Classification Search .................. 188/170, 188/72.6–72.9, 73.1, 151 R, 152, 265; 92/63, 92/64, 29, 33, 129, 130 A; 303/89
See application file for complete search history.

(56) References Cited

U.S. PATENT DOCUMENTS

| 4,364,305 A | * | 12/1982 | Dalibout et al. .................. 92/63 |
| 4,478,319 A | * | 10/1984 | Casalone et al. .............. 188/170 |
| 4,795,005 A | * | 1/1989 | Wirth ........................ 188/153 R |
| 5,038,896 A | | 8/1991 | Wirth ........................ 188/153 R |

(Continued)

FOREIGN PATENT DOCUMENTS

DE    3414548 A1 * 10/1985

(Continued)

OTHER PUBLICATIONS

Jul. 6, 2010 English Translation of the International Preliminary Report on Patentability for International Patent Application No. PCT/EP2008/010052.

(Continued)

*Primary Examiner* — Melody Burch
(74) *Attorney, Agent, or Firm* — Barnes & Thornburg LLP

(57) ABSTRACT

The invention relates to a combination cylinder including a service brake cylinder as an active service brake with at least one pressure-medium-actuated service brake piston which actuates a brake mechanism via a service brake piston rod, and a spring store brake cylinder as a passive parking brake with a spring store brake piston which is actuated by pressure medium counter to the action of at least one store spring, with the spring store brake piston transmitting the force of the at least one store spring to the service brake piston rod by a force-transmitting gearing in the parking braking situation. The invention provides for the gearing to be designed such that the movements of the spring store brake piston and of the service brake piston rod are coaxial and the force transmission ratio becomes greater with progressive stroke of the spring store brake piston.

16 Claims, 15 Drawing Sheets

U.S. PATENT DOCUMENTS

| | | | |
|---|---|---|---|
| 6,253,886 B1 * | 7/2001 | Brugait et al. | 188/170 |
| 6,799,502 B2 * | 10/2004 | Wolfsteiner et al. | 92/29 |
| 2004/0168867 A1 * | 9/2004 | Kerscher et al. | 188/72.6 |
| 2010/0307873 A1 * | 12/2010 | Kraus et al. | 188/72.2 |

FOREIGN PATENT DOCUMENTS

| | | |
|---|---|---|
| DE | 19514463 C1 | 11/1996 |
| EP | 0 146 750 A | 7/1985 |
| EP | 0 392 388 A2 | 10/1990 |
| EP | 0 553 450 | 8/1993 |
| EP | 0 738 643 A | 10/1996 |
| FR | 2 757 122 A | 6/1998 |

OTHER PUBLICATIONS

Jul. 1, 2010 English Translation of the Written Opinion of the International Searching Authority for International Patent Application No. PCT/EP2008/010052.

International Search Report mailed Mar. 27, 2009 for International Patent Application No. PCT/EP2008/010052.

\* cited by examiner

COMBINATION CYLINDER WITH PAWL-ACTUATED EMERGENCY RELEASE DEVICE FOR THE PARKING BRAKE

CROSS-REFERENCE TO RELATED APPLICATIONS

The present application claims the benefit of priority under 35 U.S.C. 120 to U.S. patent application Ser. No. 12/745,988 filed 8 Jun. 2010, as a continuation application which claims the benefit of priority to under 35 U.S.C. 371 to International Patent Application No. PCT/EP2008/010052 filed 27 Nov. 2008, and which further claims the benefit of priority to German Patent Application No. 10 2007 058 670.3 filed 6 Dec. 2007, the contents of which are incorporated herein by reference in their entirety.

DESCRIPTION

Prior Art

The present invention relates to a combination cylinder comprising a service brake cylinder as an active service brake with at least one pressure-medium-actuated service brake piston which actuates a brake mechanism via a service brake piston rod, and a spring store brake cylinder as a passive parking brake with a spring store brake piston which may be actuated by pressure medium counter to the action of at least one store spring, with the spring store brake piston transmitting the force of the at least one store spring to the service brake piston rod in the parking braking situation, as per the preamble of claim 1.

In present-day rail vehicles, the spatial conditions in the bogies may be very restricted. In bogies of high-speed trains in particular, it may be necessary for up to four brake disks to be arranged on one axle. Furthermore, the installation space for the brakes may be often restricted by drive units or gauge tie bars of electromagnetic rail brakes. These problems may be particularly pronounced if so-called combination cylinders, in which a pressure-medium-actuated service brake cylinder as a service brake and a spring store brake cylinder as a passive parking brake may be flange-mounted on one another, may be used as bogie brakes, because such combination cylinders take up a relatively large amount of installation space and may be larger than a service brake cylinder without a spring store brake cylinder.

An active brake may be generally understood to mean a brake which may be applied when pressurized and which may be released in the event of a pressure reduction. In most cases, this may be the service brake. In contrast, in a passive brake such as a spring store brake as a parking brake, the brake force may be generated by the store spring, wherein if the spring store brake cylinder may be pressurized, said spring store brake cylinder may be forced counter to the action of the store spring into the brake released position, and said spring store brake cylinder may be moved into the applied position by the action of the store spring in the event of a pressure reduction.

To prevent parked rail vehicles from rolling away, the parking brake must ensure a correspondingly high braking force even without an external energy supply. For this purpose, use may be made of spring store brake cylinders with store springs, which impart the braking force required for the parking brake by means of the spring force of the store springs. The store springs may be preloaded by aerating a spring store brake chamber. If the spring store brake chamber may be deaerated, then the spring force of the store springs may be supported on the levers of the brake caliper, and thereby generates the pressure force on the brake linings.

If a rail vehicle which may be parking-braked in this way must be towed, a compressed air supply for the rail vehicle, by means of which the parking brake designed as a spring store brake can be pneumatically released, may be often not available. For this situation, the parking brake must be equipped with a mechanical emergency release or auxiliary release device, by means of which the parking brake can be released by hand, that is to say without using external energy. In practice, the emergency release device may be also used to set the brake caliper into a force-free state during brake lining changes, since changing the brake linings with the parking brake released only pneumatically may be too unsafe, because an undesired application of the spring store brake as a result of a pressure drop poses too great a safety risk for the servicing personnel.

The emergency release device should also be designed such that, after a mechanical release of the spring store brake, the full braking function may be available again once the spring store brake chamber has been charged with a minimum release pressure (automatic return to readiness).

EP 0 072 404 B1 discloses a spring store brake cylinder in which two springs nested one inside the other act on a coaxial spring store brake piston. Situated in the piston tube may be a nut thread which may be in engagement with a spindle thread of the piston rod. The threaded spindle drive may be non-self-locking. If the spring store cylinder may be deaerated, then the springs press via the pistons and piston rods on the pistons of the service cylinder. If an axial force may be transmitted via the thread, then a torque may be generated between the nut thread in the piston and the spindle thread, which torque must be supported. For this purpose, a coupling sleeve may be arranged in a movable but rotationally fixed manner (for example by a splined shaft profile) on the spindle, which coupling sleeve may be coupled in a rotationally fixed manner in the direction of the thread torque by a wrap spring to a tube piece fixedly screwed to the piston. For an emergency release, the hook-shaped end of the wrap spring may be rotated by means of the slotted coupling sleeve in the direction in which the coils may be expanded. Here, the spindle may be screwed in the piston and thereby rotates the coupling sleeve, such that the wrap spring may be contracted again from the other side. For the complete dissipation of the brake force, the coupling sleeve must be rotated to a correspondingly great extent.

A disadvantage of said type of emergency release may be that its action may be slow and it requires a very long actuating travel. A remote actuation, in order to operate the emergency release device for example from the side of the vehicle, can therefore be realized only with a great deal of difficulty.

EP 0944512 B1 discloses a generic combination cylinder having a spring store brake cylinder in which a plurality of springs may be arranged in a stellate fashion and interact with two spring store brake pistons which may be arranged in series. The piston tube of one of the two spring store brake pistons may be provided with a nut thread which engages into the thread of a tubular spindle. If the two spring store brake cylinders may be deaerated, then the spring force may be supported via the thread of the one spring store brake piston on the spindle. The latter in turn transmits the force via its end side into the piston tube of the service brake piston, and to the adjusting mechanism accommodated therein, and from there to the brake caliper.

The thread torque generated by the spring force may be supported firstly by the spring store brake piston with the nut thread via two guide bolts in the intermediate base of the spring store brake cylinder. Secondly, the torque acting on the spindle may be supported by a bar in the cylinder housing, which bar engages into a longitudinal groove in the spindle tube and may be guided in a bore in the cylinder housing. During the braking stroke, the bar slides in the groove of the spindle under increasing torque. If, for the emergency release of the spring store, the bar may be pulled out of the groove of the spindle and therefore the support of the spindle torque may be eliminated, then the spindle turns to the right in the spring store brake piston until it abuts against the intermediate base and the spring store brake piston abuts against the cylinder base. Here, the service brake piston passes into the release position, and the brake may be free from force.

A disadvantage of said arrangement of the torque support may be that, at all braking strokes of the spring store, a sliding movement between the bar and spindle groove takes place under force, and therefore a certain amount of wear occurs on the contact surfaces.

It may be therefore an object of the present invention to further develop a combination cylinder of the type mentioned in the introduction such that it has a lower level of wear.

DISCLOSURE OF THE INVENTION

The invention proposes that the parking brake force generated by the spring store brake piston be introduced into a rotationally fixedly mounted thrust ring which can be actuated coaxially with respect to a central axis of the combination cylinder and which exerts axial forces on a spindle drive, and an axial force transmission be provided between the spindle drive and the service brake piston rod, with one part of the spindle drive being mounted in a rotationally fixed manner and another part of the spindle drive being rotatably mounted coaxially with respect to a central axis of the combination cylinder, and it being possible for the rotational movement of the rotatable part of the spindle drive to be blocked by a releasable rotational lock for axial force transmission between the rotationally fixed part and the rotatable part and to be unblocked in order to eliminate said axial force transmission, and with the rotational lock comprising a manually actuable pawl which can engage into an external toothing of the rotatable part of the spindle drive and which may be rotatably mounted on the thrust ring, and the releasable rotational lock being part of an emergency release device for the emergency release of the parking brake, and the releasable rotational lock being blocked in normal operation and being released for the emergency release of the parking brake.

'Emergency release' may be to be understood to mean a mechanical release of the spring store brake when the compressed air supply may be disrupted and consequently the spring store brake piston can no longer be moved into the released position by pressure medium actuation.

If, for the emergency release of the parking brake, the rotational lock may be actuated in such a way that the rotatable part of the spindle drive can rotate freely relative to the rotationally fixed part via a non-self-locking gearing, then the rotatable part may be screwed in relation to the rotationally fixed part of the spindle drive until both parts may be free from force in relation to one another. Here, the spring store brake piston moves as far as the stop against the base of the spring store brake cylinder.

In this way, the torque generated by the force of the store springs of the spring store brake may be supported on a very short path between the rotatable part and the rotationally fixed part of the spindle drive. If the parking brake is applied, the spring store brake piston, the spindle drive, the thrust ring and the pawl thus perform the braking stroke together, without a torque having to be supported. In particular, there may be no sliding surfaces at risk of wear.

Advantageous refinements and improvements of the invention specified in the independent claims may be possible by means of the measures specified in the subclaims.

The pawl may be designed to be pivotable about an axis parallel to the central axis of the combination cylinder, and if said pawl can be lifted out of the external toothing of the rotatable part of the spindle drive by pressing a pressure pin which may be movably mounted in the combination cylinder.

For the emergency release of the parking brake, the rotational lock may be then released, with the rotatable part of the spindle drive being screwed relative to the rotationally fixed part of the spindle drive by means of the thread, and with the spring store brake piston moving until it abuts against a base of the spring store brake cylinder, and with the service brake piston, driven by a restoring spring, moving together with the rotatable part of the spindle drive into a released position.

During the emergency release of the parking brake, the pawl can be held in the lifted-out position via the engagement of a locking pin. As in the prior art, the spring store brake piston can be forced into the release position by the pressurization of a spring store brake chamber. Here, according to one refinement of the invention, the thrust ring may be driven along and the locking pin lifted out, as a result of which the pawl engages into the external toothing of the rotatable part of the spindle drive again, and the rotational lock thereby locks again. The emergency release device may be thus designed such that, after the emergency release of the spring store or parking brake, the full braking function may be available again once the spring store brake chamber has been charged with a minimum release pressure.

According to one variant, the thrust ring transmits the axial force via an axial thrust bearing to a gearwheel which forms the rotatable part of the spindle drive, into the teeth of which gearwheel can engage the pawl of the rotational lock, with the gearwheel being rotatably mounted on a rotationally fixed part of the spindle drive via the thread, which transmits the axial force to the service brake piston rod.

Alternatively, the thrust ring and the rotationally fixed part of the spindle drive may be combined and the rotational lock may be arranged between the thrust ring and the rotatable part of the spindle drive.

The parking brake force generated by the spring store brake piston can be introduced into the thrust ring via a force-transmitting gearing.

In one refinement, two gearings, which may be eccentric in relation to the central axis, may be provided on the thrust ring such that torques about an axis perpendicular to the central axis may be compensated.

In particular, the force-transmitting gearbox may be designed such that the movements of the spring store brake piston and of the service brake piston rod may be coaxial and, in order to realize an approximately constant store spring force on the service brake piston rod over the entire stroke of the spring store brake piston, the force transmission ratio becomes greater with progressive stroke of the spring store brake piston.

On account of the first measure, the vertical extent of the combination cylinder may be decreased because the service brake cylinder and the spring brake cylinder can be flange-mounted coaxially on one another. This may be expedient in particular because the vertical installation space in bogies may be severely restricted and more space may be available in the horizontal direction.

The second measure results in an increase in force with progressive stroke of the spring store brake piston, which leads to an advantageously high parking brake force in the end position of the spring store brake piston, and therefore in the applied state of the spring store brake. The spring store force, which itself falls with the stroke of the spring store piston, may be then compensated by the increasing force transmission ratio of the gearing. With suitable design of the gearing, it may be possible to realize an approximately constant and high store spring force on the service piston rod over the entire store of the spring store piston.

According to a refinement, at least one bearing journal which may be arranged perpendicular to the central axis of the combination cylinder may be formed on the thrust ring, on which bearing journal may be pivotably mounted at least one angle lever which may be articulatedly connected with its one lever arm to the spring store brake piston and with its other lever arm to a fixed support surface of the combination cylinder in such a way that, during an actuation of the spring store brake piston in the parking braking situation, a rotation of the supported angle lever about the bearing journal and therefore an actuation of the thrust ring in the same direction may be triggered. An angle lever of said type then forms an angle gearing, with the respective transmission ratio being determined by the present position of the angle lever or lever arms of the angle lever.

The parking brake force generated by the spring store brake piston in the parking brake situation may be consequently introduced via the angle lever as a gearing into the thrust ring, and may be thereby boosted. Said boosted force may be introduced by the thrust ring via the blockable thread into the spindle drive, and may be introduced from there via the thrust bearing into the service brake piston tube and finally into a spindle yoke, the stroke of which ultimately introduces said boosted force into a brake mechanism, e.g., into a brake caliper of a disk brake of a rail vehicle.

If two angle levers may be now provided which may be rotatably mounted on bearing journals, which extend outward perpendicular to the central axis of the combination cylinder, of the thrust ring, which angle levers may be arranged reversed in relation to one another with respect to a plane comprising the central axis of the combination cylinder (that is to say the position of one angle lever may be defined by a rotation of the other angle lever by 180 degrees about the central axis, point-symmetrical arrangement), then the reaction moments arising from the spacing, which acts as a lever, of the angle levers from the central axis may be cancelled out, such that advantageously no torque acts on the thrust ring or on the spring store brake pistons about an axis perpendicular to the central axis (tilting moment).

In each case one lever arm of an angle lever may be connected to the spring store brake piston via a doubly articulatedly connected tension lug, and in each case one other lever arm of an angle lever may be supported by a support roller which can roll on a fixed support surface, as a result of which wear may be minimized.

To guide the thrust ring in the combination cylinder in a defined rotationally fixed but axially movable manner, the bearing journals of the thrust ring bear sliding bodies on the end side, which sliding bodies may be guided in a rotationally fixed manner in sliding-block guides which extend in the direction of the central axis of the combination cylinder.

The support surface for the rollable support rollers of the other arms of the angle lever may be formed on a partition between the spring store brake cylinder and the service brake cylinder, which partition may be present in any case, such that no further components may be required. This may be because the partition simultaneously forms a support surface for the at least one spring store of the spring store brake cylinder.

According to a further variant of the combination cylinder according to the invention, by means of the spring store brake piston, at least one wedge contour can be actuated parallel to the central axis of the combination cylinder, along which wedge contour can be guided a lever arm of at least one lever which may be rotatably mounted on the combination cylinder and whose other lever arm may be supported on the thrust ring, with a guidance of the one lever arm of the lever along the wedge contour causing a rotational movement of the lever about a lever rotational axis and therefore an axial force, in the same direction as the movement of the spring brake cylinder, on the thrust ring. Here, the lever rotational axis of the lever may be for example arranged perpendicular to the central axis of the combination cylinder.

In one refinement of the measure, two wedge contours may be provided which engage at least partially around the thrust ring as viewed in the direction of the lever rotational axis of the lever, which wedge contours interact with two levers which may be symmetrical with respect to the central axis of the combination cylinder and may be combined to form a double lever. The two levers result in an improved load distribution. Furthermore, the load distribution may be symmetrical.

Consequently, if the spring store brake cylinder, in the parking brake situation, moves in the application direction, then the two wedge contours may be moved concomitantly, as a result of which the one lever arms of the rotational levers may be moved along the wedge contours and thereby trigger a rotational movement of the rotational levers, as a result of which the other lever arms of the rotational levers set the thrust ring in an axial movement in the same direction as the movement of the spring store brake piston. The thrust ring, which may be rotationally fixedly mounted in the combination cylinder, then transmits the axial force acting thereon via the axial thrust bearing to the rotating part of the spindle drive, which however in normal operation may be prevented from rotating relative to the rotationally fixed part of the spindle drive by the rotational locking device. The axial force may be then transmitted by the rotationally fixed part to the service brake piston rod.

According to a further variant of the combination cylinder according to the invention, a sliding-block guide mechanism as a gearing comprising at least one roller lug, which may be articulatedly connected to the thrust ring, may be provided with at least one sliding-block guide in which may be guided at least one sliding-block guide lever which may be articulatedly connected at one side to the housing of the combination cylinder and at the other side to at least one tension lug which may be articulatedly connected to the spring brake cylinder.

Here, the roller lug may be provided, on its end pointing away from the thrust ring, with a rotatable roller which can roll on a sliding-block guide surface of the sliding-block guide lever. The thrust ring may be for example mounted in a non-rotatable manner in the housing of the combination cylinder by at least one sliding guide.

If two roller lugs with sliding-block guides, two sliding-block guide levers which may be guided in the sliding-block guides, and two tension lugs may be provided, which may be arranged reversed in relation to one another with respect to a plane comprising the central axis of the combination cylinder, then tilting moments arising from an actuation of the gearing may be compensated.

Consequently, if the spring store brake piston moves in the application direction in the parking brake situation, then the spring force of the store spring may be supported on the thrust ring via the two tension lugs, the sliding-block guide lever and the roller lugs. The thrust ring then dissipates the force to the service brake piston rod and therefore to the brake mechanism. On account of this kinematic arrangement, in each case one roller lug may be automatically set to the angular position, which may be dependent on the stroke of the spring store brake piston, of the associated sliding-block guide lever, because the roller lug assumes the position in which the line of force action of the roller lug may be perpendicular to the tangent of the sliding-block guide surface at the contact point of the support roller. As a result of the kinematically induced adaptation of the position of the roller lugs as a function of the stroke of the spring store brake piston, the transmission ratio of the gearing formed in this way may be increased.

As in the other exemplary embodiments, it may be possible by means of these kinematics of the gearing, too, for the spring store brake cylinder and the service brake cylinder to be arranged coaxially with respect to the central axis of the combination cylinder, with the movements of the service brake cylinder and of the spring store brake cylinder being in the same direction during brake application and release situations.

Not least, the invention also relates to a brake caliper unit of a disk brake of a rail vehicle comprising one of the above-described combination cylinders.

Greater detail will be entered into in the following description of exemplary embodiments of the invention.

FIGURES

Exemplary embodiments of the invention may be illustrated in the drawing and may be explained in more detail in the following description, in which.

DESCRIPTION OF THE EMBODIMENTS

Figure 1:
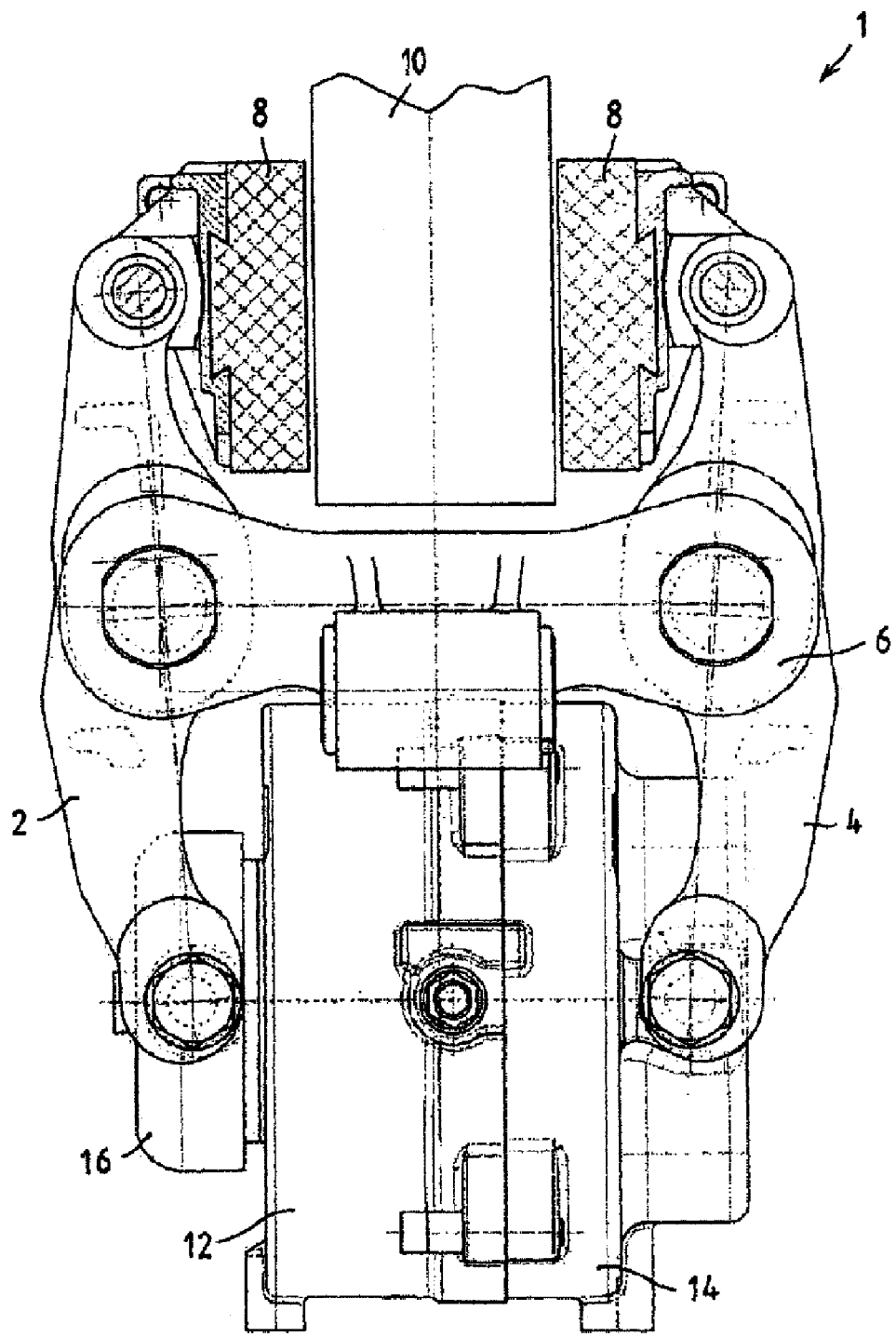
FIG. 1 shows a plan view of a brake caliper unit of a rail vehicle having a combination cylinder according to the invention.

The brake caliper 1 of a rail vehicle shown in FIG. 1 has two brake caliper levers 2, 4 which run substantially parallel to one another. The two brake caliper levers 2, 4 may be articulatedly connected to one another in the central region of their longitudinal extent by a tension rod 6. The brake caliper levers 2, 4 and the tension rod 6 lie in or run parallel to a brake caliper plane which runs parallel to the drawing plane.

The one ends of the brake caliper levers 2, 4 bear brake pads 8 which may be articulatedly connected by means of bolts and which can engage in a frictionally locking manner into a brake disk 10. Situated between the other ends of the brake caliper levers 2, 4 is a combination cylinder 12, whose housing 14 may be articulatedly connected to one brake caliper lever 4 and whose service brake piston may be articulatedly connected via a service brake piston rod and a spindle yoke 16 to the other brake caliper lever 2.

It can be seen on the basis of FIG. 1 that the brake caliper 1 has only a small transmission ratio corresponding to the lever ratios of the brake caliper levers 2, 4, that is to say the pressure force of the brake pads 8 may be higher by only a small transmission ratio factor than the spreading force, which can be exerted by the combination cylinder 12, for the brake caliper levers 2, 4.

Figure 2:
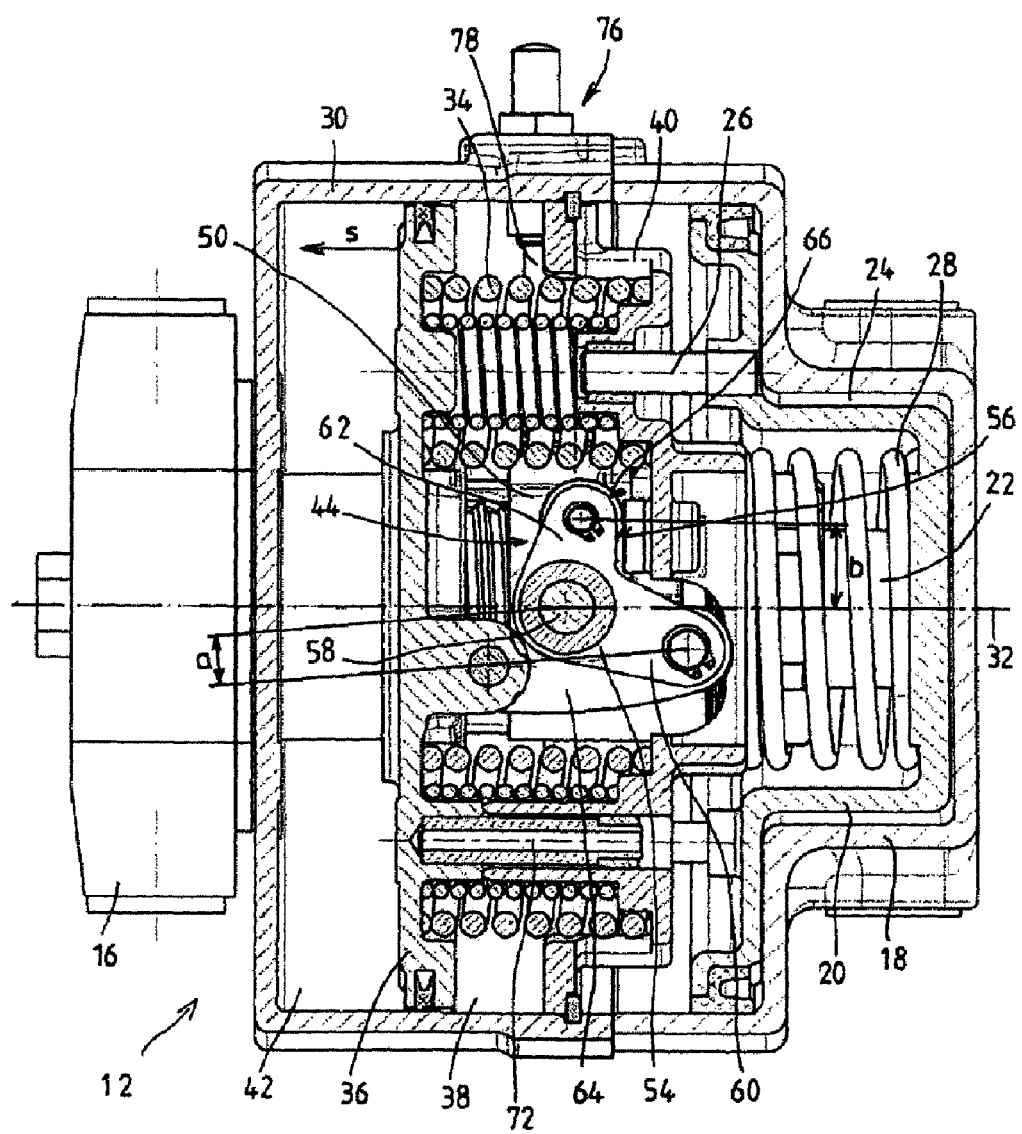
FIG. 2 shows a vertical cross longitudinal cross-sectional illustration of the combination cylinder from FIG. 1 with a combination cylinder according to a first embodiment in the released position.

FIG. 2 therefore illustrates in the released position a combination cylinder 12 with which a higher brake force can be obtained in the parking brake situation. The combination cylinder 12 comprises a service brake cylinder 18 as an active service brake with a pressure-medium-actuated service brake piston 20 which actuates the brake caliper lever 2 via a service brake piston rod 22 and via the spindle yoke 16, with the pressurization of and release of pressure from the service brake piston 20 taking place by respective aeration and deaeration of a service brake chamber 24. An anti-twist facility, for example by a bolt 26 which may be held in the combination cylinder 12 and which may be guided axially in the service brake piston 20, ensures that the service brake piston 20 may be rotationally fixedly guided in the service brake cylinder 18. A restoring spring 28 pre-loads the service brake piston 20 into the right-hand-side released position shown in FIG. 2.

The service brake cylinder 18 may be flange-mounted, coaxially with respect to a central axis 32 of the combination cylinder 12, on a spring store brake cylinder 30 as a passive parking brake, in which spring store brake cylinder 30 may be guided a spring store brake piston 36 which can be actuated by pressure medium counter to the action of, e.g., a plurality of store springs 34 arranged one inside the other. The store springs 34 may be accommodated in a spring chamber 38 of the spring store brake cylinder 30, and here may be supported at one side on the spring store brake piston 36 and at the other side on a partition 40 between the spring store brake cylinder 30 and the service brake cylinder 18. By pressurizing a spring store brake chamber 42 formed on the other side of the spring store brake piston 36, the spring store brake piston 36 moves counter to the action of the store springs 34 into the right-hand-side released position shown in FIG. 2.

In the parking brake situation, the spring store brake piston 36 transmits the force of the store springs 34 via a force-transmitting gearing 44 to the service brake piston rod 22 and to the service brake piston 20 which may be attached thereto. The force may be then transmitted from the service brake piston rod 22 to the spindle yoke 16 and from there to the corresponding brake caliper lever 2 in order to bring about an application movement of the brake caliper 1, during which the brake pads 8 come into frictionally locking engagement with the brake disk 10.

Figure 6:
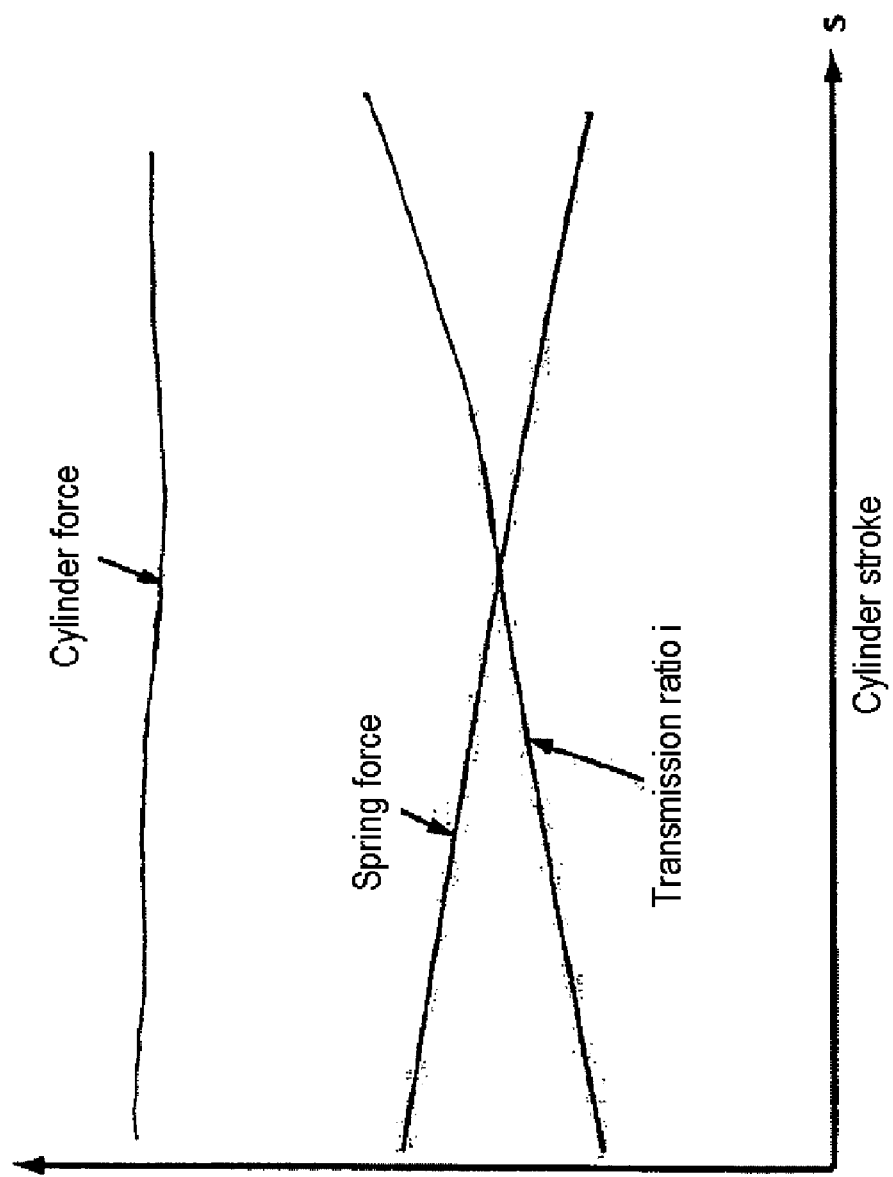
FIG. 6 shows a diagram illustrating the dependency of the spring force, the transmission ratio i of a gearing of the combination cylinder and the cylinder force on the stroke s of a spring store piston of the combination cylinder according to the invention.

Here, the gearing 44 may be designed such that the movements of the spring store brake piston 36 and of the service brake piston 20 may be coaxial and the force transmission ratio i of the gearing 44 becomes greater with progressive stroke s of the spring store brake piston 36, as shown in particular by the curve in FIG. 6.

Figure 5:
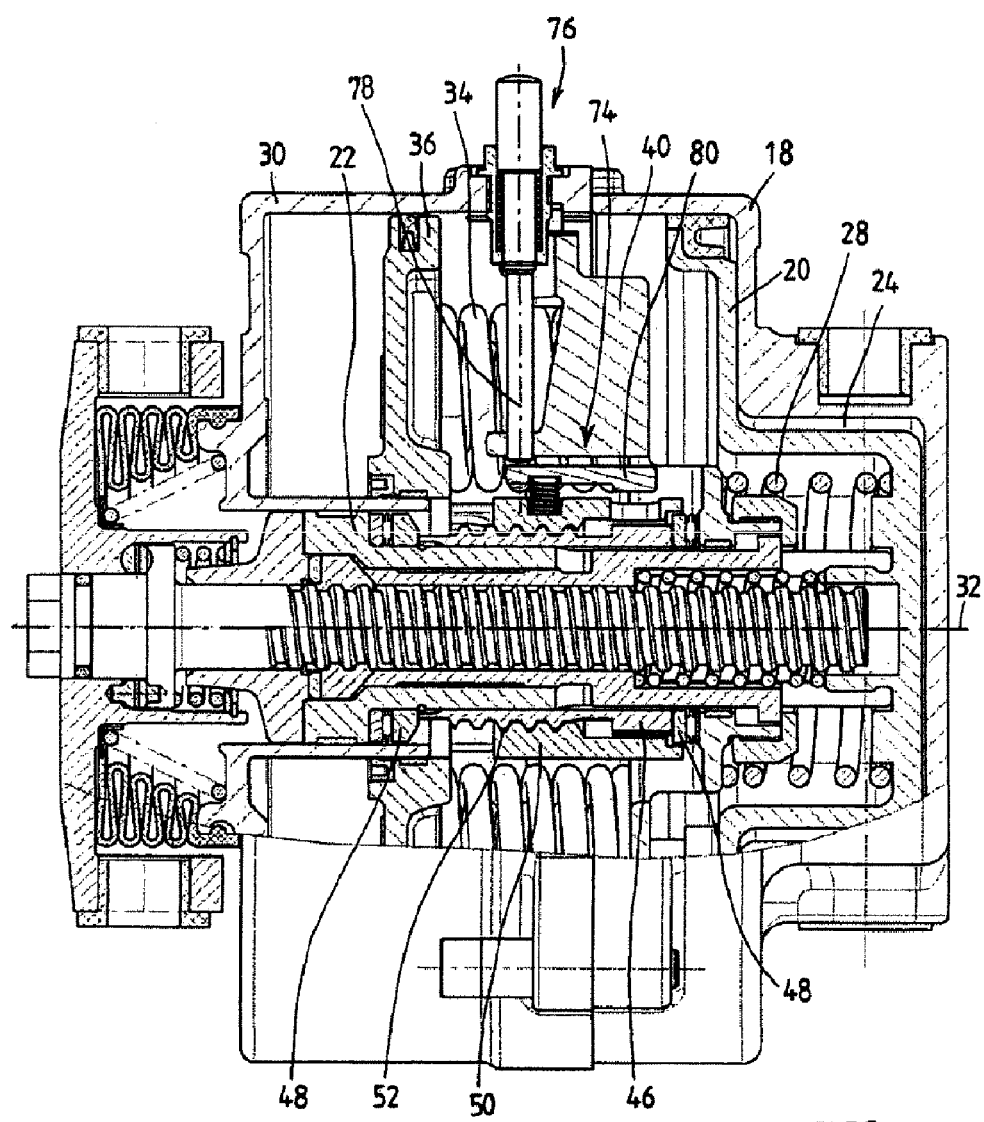
FIG. 5 shows a central vertical longitudinal cross-sectional illustration of the combination cylinder from FIG. 2 in the released position.

As can be seen from FIG. 5, a spindle 46 projects through a passage opening of the partition 40 in the direction of the service brake piston 20, from which the service brake piston rod 22 in the form of a service brake piston tube extends into the interior of the spindle 46 in such a way that the spindle 46 may be rotatably mounted on the service brake piston tube 22, for example by a plain bearing arrangement. Axial thrust bearings 48 may be arranged on radially outer shoulders of the service brake piston tube 22, by means of which axial thrust bearings 48 a thrust force can be transmitted from the spindle 46 to the service brake piston tube 22. Therefore, the spindle 46 and the service brake piston tube 22, and the spring store brake piston 36 and the service brake piston 20, may be arranged coaxially with respect to one another and in particular with respect to a central axis 32 of the combination cylinder 12.

To realize the force transmission by means of the gearing 44, as shown in an embodiment of the combination cylinder 12 in FIG. 2, at least one angle lever 54 may be mounted, so as to be pivotable about an axis perpendicular to the central axis 32 of the combination cylinder 12, on a thrust ring 50 in which the spindle 46, which may be rotatably mounted on the service brake piston tube 22, can be screwed by a non-self-locking thread 52 (see FIG. 5), which angle lever 54 may be articulatedly connected with its one end to the spring store brake piston 36 and with its other end to a fixed support surface 56 of the combination cylinder 12 (FIG. 2).

Figure 3:
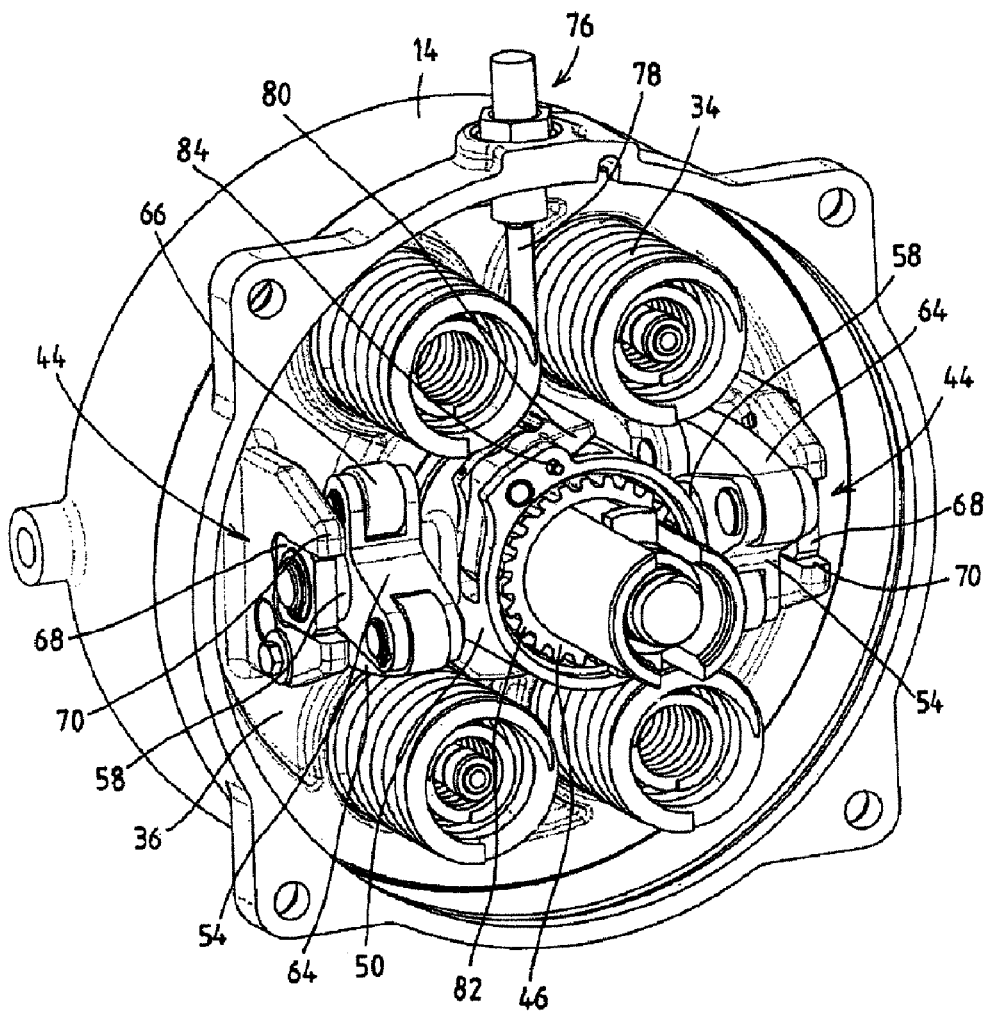
FIG. 3 shows a cut-away perspective illustration of the combination cylinder from FIG. 2.

Two angle levers 54 may be provided which may be rotatably mounted on bearing journals 58, which extend outward perpendicular to the central axis 32 of the combination cylinder 12, of the thrust ring 50, which angle levers 54 may be arranged reversed in relation to one another with respect to a plane comprising the central axis 32 of the combination cylinder, that may be to say the ends of the angle lever 54 may be arranged so as to run oppositely, as can be seen best from FIG. 3.

FIG. 2 shows that, e.g., in each case the one end of a lever arm 60 of an angle lever 54 may be connected to the spring store brake piston 36 by a doubly articulatedly connected tension lug 64, and the other end of the other lever arm 62 of an angle lever 54 may be supported by a support roller 66 which can roll on the fixed support surface 56 and which may be rotatably mounted on the other lever arm 62 of the angle lever 54. The support surfaces 56 for the rollable support rollers 66 of the angle levers 54 may be formed on the partition 40 between the spring store brake cylinder 30 and the service brake cylinder 18 and face toward the spring chamber 38 in which the store springs 34 may be accommodated.

To guide the thrust ring 50 in the combination cylinder 12 in a rotationally fixed but axially movable manner, the bearing journals 58 of the thrust ring 50 bear sliding bodies 68 on the end side, which sliding bodies may be guided in sliding-block guides 70 (FIG. 3) which extend in the direction of the central axis 32 of the combination cylinder 12 and which may be formed in the spring store brake piston 36. The spring store brake piston 36 in turn may be prevented from twisting in the spring brake cylinder 30 by at least one guide bolt 72 which extends parallel to the central axis 32 of the combination cylinder 12 and may be fixedly connected to the spring store brake piston 36 and may be guided in the partition 40, such that the thrust ring 50 may be also supported in a rotationally fixed manner in the spring brake cylinder 30.

The spindle 46 can be screwed relative to the thrust ring 50, more precisely in the thrust ring 50, by means of the non-self-locking thread 52 (FIG. 5) which can be blocked and unblocked by a releasable rotational lock 74. The releasable rotational lock 74 may be part of an emergency release device 76 for the emergency release of the spring store brake cylinder 30. 'Emergency release' is to be understood to mean a mechanical release of the spring store brake when the compressed air supply may be disrupted and consequently the spring store brake piston 36 can no longer be moved into the released position by pressure medium actuation.

Figure 4:
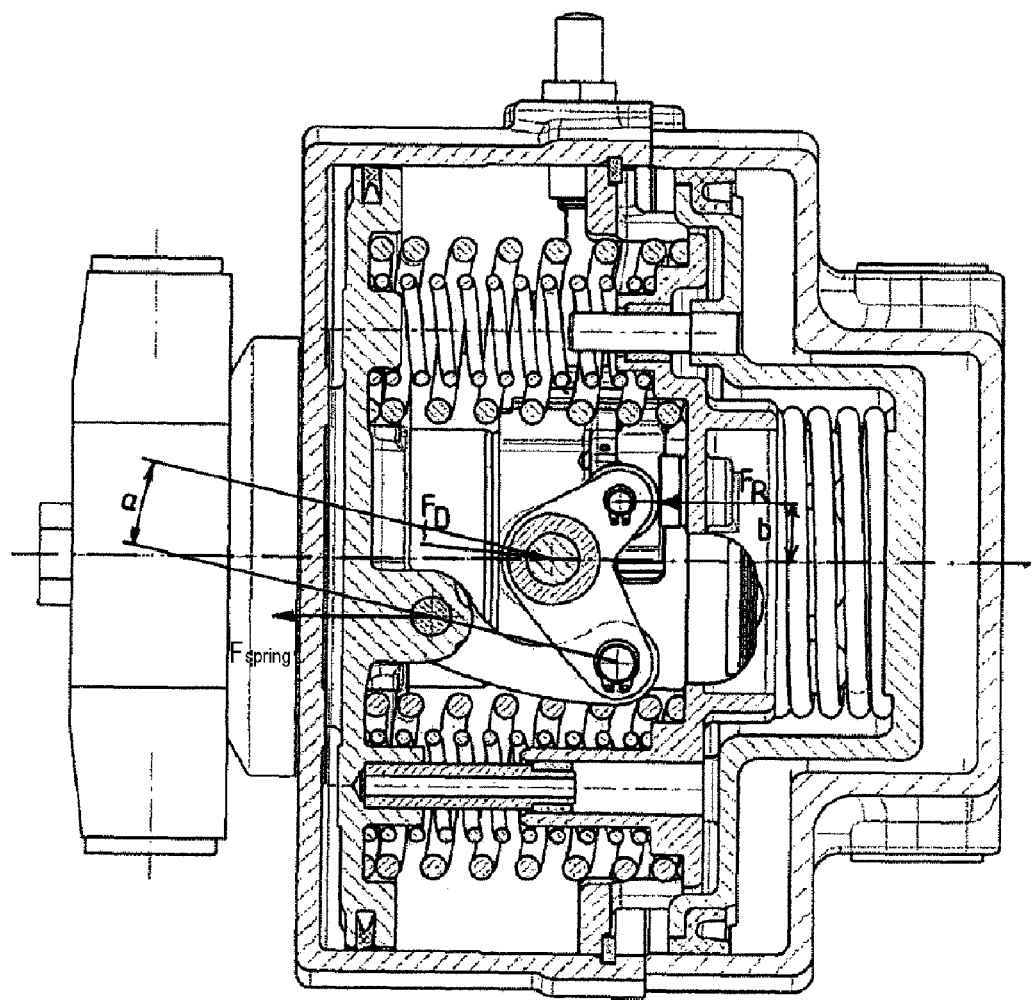
FIG. 4 shows a longitudinal cross-sectional illustration of the combination cylinder from FIG. 2 with the combination cylinder in the applied position.

The angle lever 54 then forms an angle gearing 44, with the respective transmission ratio i being determined by the present position of the angle lever 54 or lever arms 60, 62 of the angle lever 54. Therefore, in the parking brake situation in which the spring store brake chamber 42 may be deaerated and therefore the spring store brake piston 36 may be forced by the action of the store springs 34 from the released position shown in FIG. 2 into the applied position shown in FIG. 4, force may be introduced from the spring store brake piston 36 into the tension lugs 64, which may be articulatedly connected thereto and which in turn may be articulatedly connected to the one lever arm 60 of an angle lever 54, and via the two angle levers 54 into the thrust ring 50, with the angle levers 54 thereby being firstly pulled along and secondly rotated, with the angle levers 54 supporting the reaction forces on the fixed support surface 56. Depending on the rotational position of the angle levers 54, the lever arms 60, 62 of the angle levers 54 have a different effective lever length a and b in relation to the central axes of the bearing journals 58 of the thrust ring 50, as shown by a comparison of FIG. 2 (released position) with FIG. 4 (applied position).

In other words, the lever lengths a and b, which act for generating the torque, on the lever arms 60, 62 of the angle lever 54 vary as a function of the respective rotational position of the angle lever 54, which in turn may be dependent on the stroke of the spring store brake piston 36. Therefore, however, the transmission ratio i of the lever gearing 44 formed by the angle lever 54 varies as a function of the stroke of the spring store brake piston 36 in the present case in such a way that the force transmission ratio i increases, that is to say a relatively large travel of the spring store brake piston 36 with a relatively small spring force of the store springs 34 may be transformed into a small travel of the spindle yoke 16 with a relatively large spreading force for the brake caliper 1. Here, a person skilled in the art will select the geometry, in particular the lengths of the lever arms 60, 62 of the angle levers 54, in such a way that the force transmission ratio i on account of the angle lever 54 increases with increasing rotational angle or with increasing stroke of the spring store brake piston 36, as shown by the curve in FIG. 6.

If, therefore, the spring store brake cylinder 30 may be deaerated in order to apply the parking brake, then the spring force of the store springs 34 may be supported via the spring store brake piston 36 and the tension lugs 64 on in each case the one lever arm 60 of the two angle levers 54. Here, the angle levers 54, which may be rotatably mounted on the thrust ring 50, may be supported with the support roller 66 of the in each case other lever arm 62 on the support surface 56 of the partition 40. The sum $F_D$ of the spring force $F_{Spring}$ and the roller force $F_R$ may be transmitted here in the axial direction to the thrust ring 50, the spindle 46 and the service brake piston tube 22 to the spindle yoke 16.

With progressive stroke of the spring store brake piston 36 and the associated rotation of the angle lever 54, the effective transmission ratio i of the angle lever 54 increases. With suitable selection of the lengths of the lever arms 60, 62 and/or of the angle between the lever arms 60, 62 and/or of the lengths of the tension lugs 64 and/or the position of the articulated connection thereof to the spring store brake piston 36, the reduction of the spring force of the store springs 34 over the stroke of the spring store brake piston 36 may be compensated by the increasing transmission ratio i, so as to yield approximately a profile as per FIG. 6 of the brake force acting on the spindle yoke 16, which may be approximately constant over the stroke s of the spring store brake piston 36.

By means of the two tension lugs 64 which engage at an angle on the spring store brake piston 36, a torque about the central axis 32 of the combination cylinder 12 may be introduced both into the spring store brake piston 36 and also into the thrust ring 50. The torque may be supported by the sliding bodies 68, which may be guided in the sliding-block guides 70, of the thrust ring 50 in the spring store brake piston 36, which in turn may be held in a rotationally fixed manner by the guide bolts 72 in the spring store brake cylinder 30 (FIG. 2).

The parking brake force generated by the spring store brake piston 36 may be consequently introduced into the thrust ring 50 via the angle lever 54 as a gearing 44, and may be thereby boosted. The boosted force may be introduced from the thrust ring 50 via the blockable thread 52 into the spindle 46, and from there via the axial thrust bearing 48 into the service brake piston tube 22 and the spindle yoke 16, the stroke of which, which may be thereupon directed to the left in FIG. 2 or FIG. 4, ultimately transforms the force into a rotation of the brake caliper levers 2, 4.

If no compressed air may be available for releasing the parking brake, for example on account of a defect or a leak in the compressed air system, then the parking brake can be released by manually actuating the emergency release device 76. For this purpose, by pressing a pressure pin 78 which may be vertically movably mounted in the combination cylinder 12, a pawl 80 which may be pivotable on the thrust ring 50 about an axis parallel to the central axis 32 of the combination cylinder 12 may be lifted out of an external toothing 82 of the spindle 46, as a result of which the rotational lock between the spindle 46 and the thrust ring 50 may be eliminated (FIG. 3). Since the thread 52 between the parts may be not self-locking, the spindle 46 may be screwed in the thrust ring 50 until both parts may be free from axial forces and the spring store brake piston 36 abuts against the base of the spring store brake cylinder 30. The service brake piston 20 can also, driven by the restoring spring 28, assume the released position together with the spindle 46.

The pawl 80 may be held in the lifted-out position as a result of the engagement of a locking pin 84 (FIG. 3). Only when the spring store brake piston 36 may be forced into its released position by the pressurization of the spring store brake chamber 42, and thereby drives the thrust ring 50, may be the locking pin 84 lifted out as a result of contact against the partition 40, as a result of which the pawl 80 can engage into the external toothing 82 of the spindle 46 again and thereby produce the rotational lock between the spindle 46 and the thrust ring 50 again.

A wear adjuster may be accommodated within the service brake piston tube 22, which wear adjuster may be formed for example by a single-acting step adjuster. During a service braking operation, the service brake chamber 24 may be aerated, as a result of which the service brake piston 20 actuates the spindle yoke 16, and therefore the brake caliper 1, via the service brake piston rod 22.

In the second exemplary embodiment of the invention according to FIGS. 7 to 11, those parts which remain the same and have the same action in relation to the preceding example may be denoted by the same reference symbols. In contrast to the preceding example, at least one wedge contour 86 can be actuated parallel to the central axis 32 of the combination cylinder 12 by the spring store brake piston 36, along which wedge contour 86 a lever arm 88 of at least one lever 90 which may be rotatably mounted on the combination cylinder 12 can be guided, the other lever arm 92 of which lever 90 may be supported on the thrust ring 50, with a guidance of the one lever arm 88 of the lever 90 along the wedge contour 86 causing a rotational movement of the lever 90 about a lever rotational axis 94 and therefore, by means of the other lever arm 92, generating an axial force which acts on the thrust ring and which may be aligned in the same direction as the movement of the spring store brake piston 36, as can be seen best from FIG. 8. Here, for example the lever rotational axle 94 of the lever 90 may be arranged perpendicular to the central axis 32 of the combination cylinder 12 and may be mounted for example in the cylinder cover 96 of the spring store brake cylinder 30.

The two wedge contours may be symmetrical in relation to the central axis 32 to be provided on two wedge plates 86, which at least partially surround the thrust ring 50 and which interact with two levers 90 which may be symmetrical with respect to the central axis 32 of the combination cylinder 12 and which may be combined in each case to form a double lever. A double lever 90 of the type consequently comprises an upper lever 90 a and a lower lever 90 b with in each case one lever arm 88 guided on the respective wedge contour 86 and with in each case one lever arm 92 guided on a support surface of the thrust ring 50 (FIG. 8).

Figure 10:
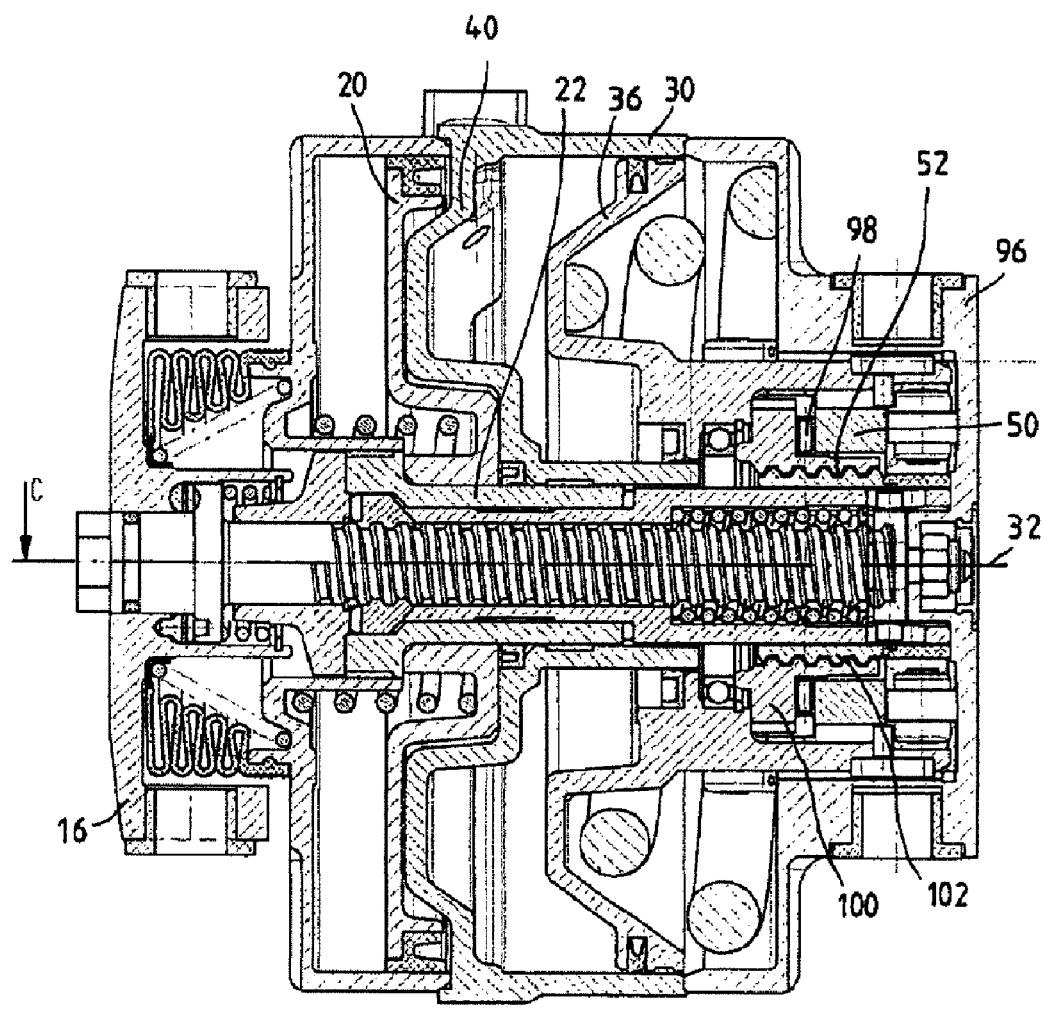
FIG. 10 shows a vertical central longitudinal cross section of the combination cylinder from FIG. 7.
Figure 11:
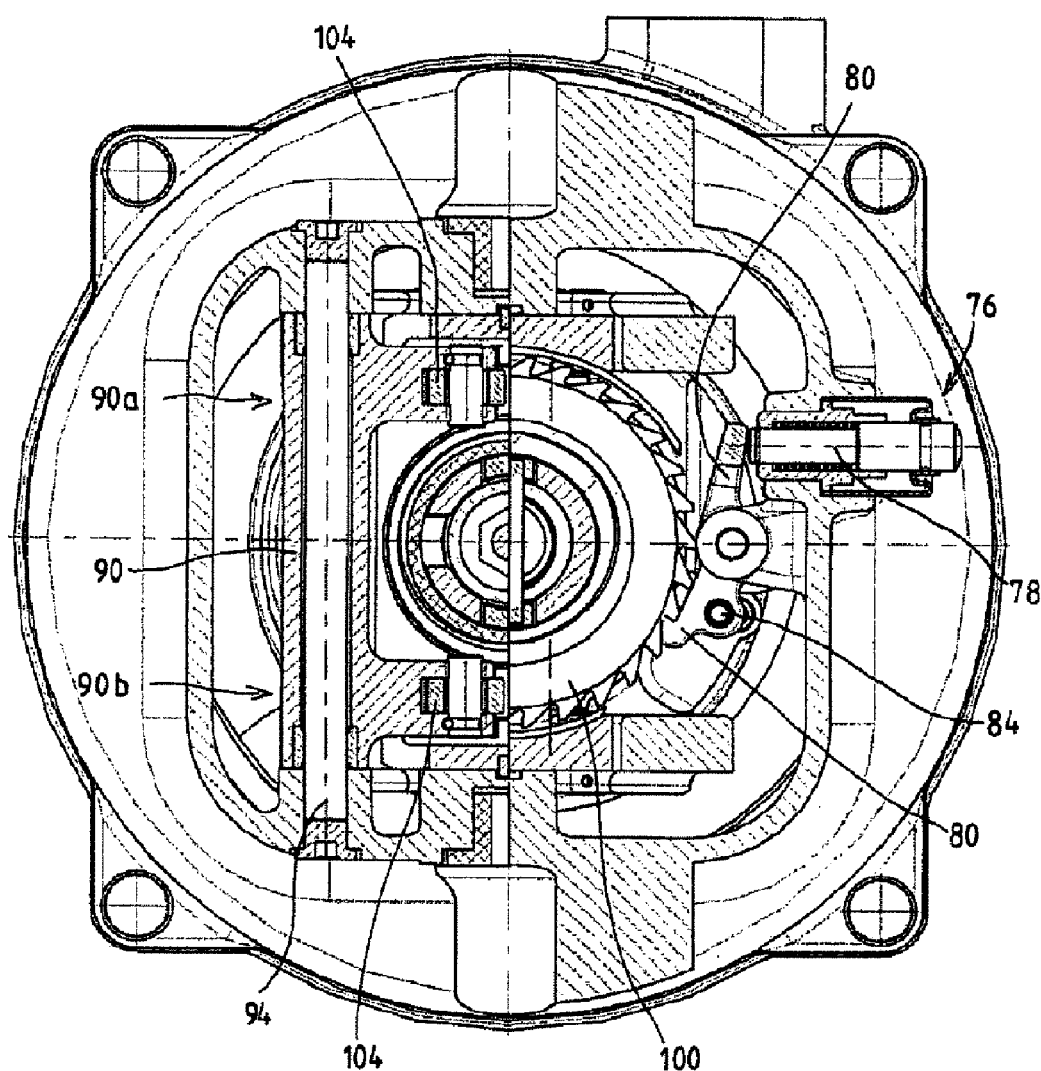
FIG. 11 shows a cross-sectional illustration of the combination cylinder from FIG. 7.
Figure 12:
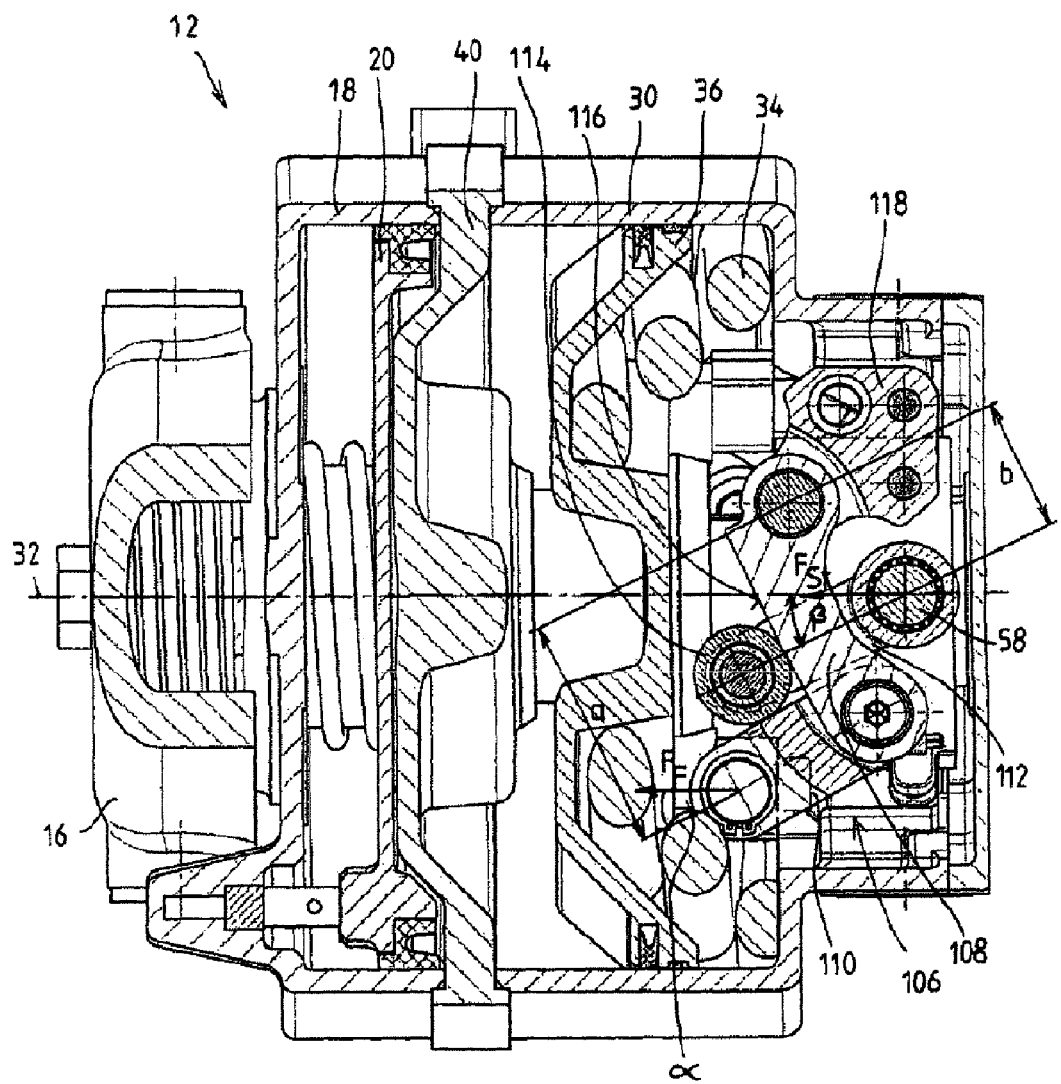
FIG. 12 shows a vertical longitudinal cross-sectional illustration of a combination cylinder according to a further embodiment in the released position.

In the variant, the thrust ring 50 transmits the axial force for example via an axial thrust bearing 98 to a rotatable part of a spindle drive in the form of a gearwheel 100 which can be rotated, on a rotationally fixed part 102 of the spindle drive, by means of the non-self-locking thread 52 about an axis which may be coaxial with respect to the central axis 32 (FIG. 10). The pawl 80 of the rotational lock 74 of the emergency release device 76 can again engage into the external toothing 82 of the gearwheel 100, which pawl 80 may be rotatably mounted in the cylinder cover 96 (FIG. 11). The rotationally fixed part 102 of the spindle drive can then transmit the axial force to the service brake piston rod 22.

As can be seen in particular from FIG. 11, the pawl 80 may be designed as a tilting lever which may be rotatable about a rotational axis 104 parallel to the central axis 32 and which can engage at one end into the external toothing 82 of the gearwheel 100 and which can be acted on at the other end by the spring-preloaded, manually actuable pressure pin 78 which projects slightly out of the housing 14 through a passage bore, in order, as a function of the position of the pressure pin 78, to rotationally fixedly connect the gearwheel 100 to the housing 14 of the combination cylinder 12 or to release the connection in order to allow the gearwheel 100 to freely rotate on the rotationally fixed part 102 of the spindle drive.

Figure 7:
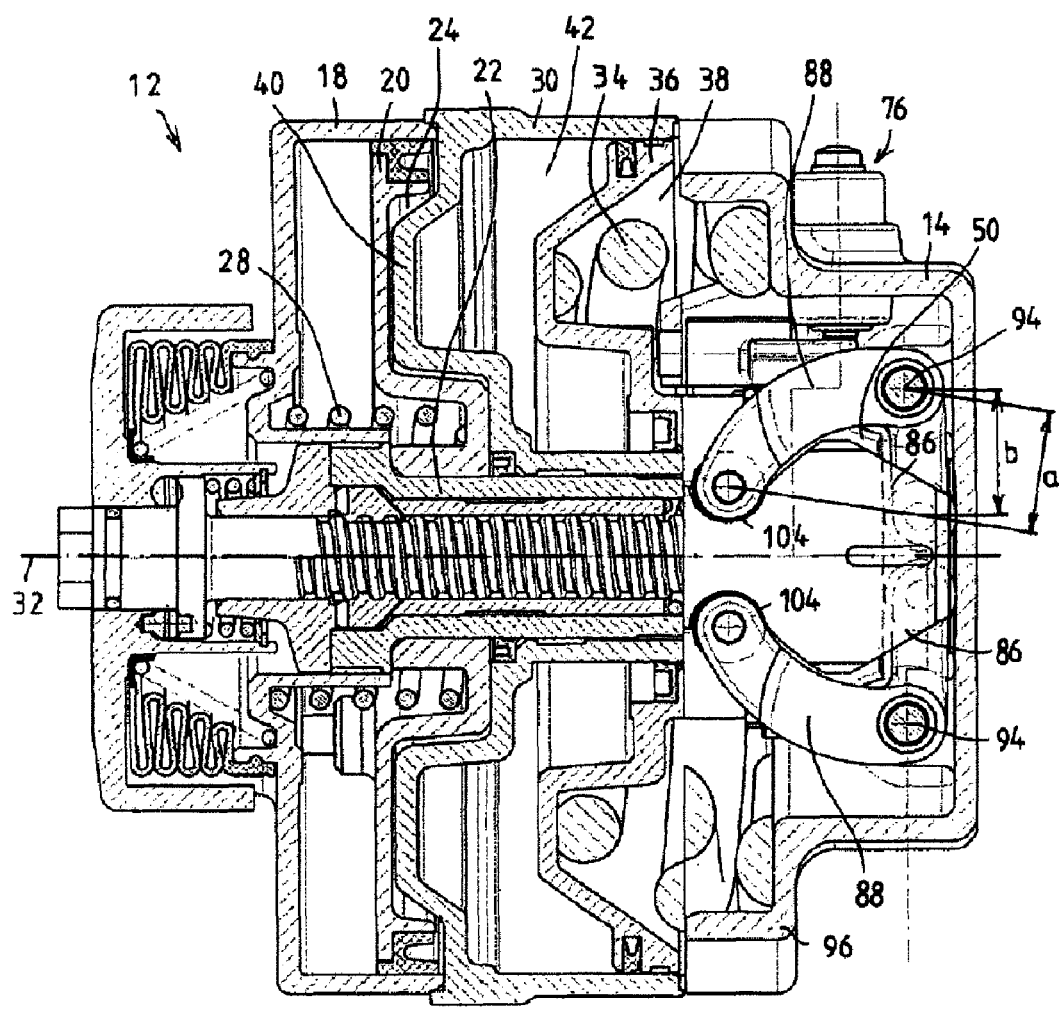
FIG. 7 shows a horizontal central longitudinal cross section of a combination cylinder according to a further embodiment in the released position.
Figure 8:
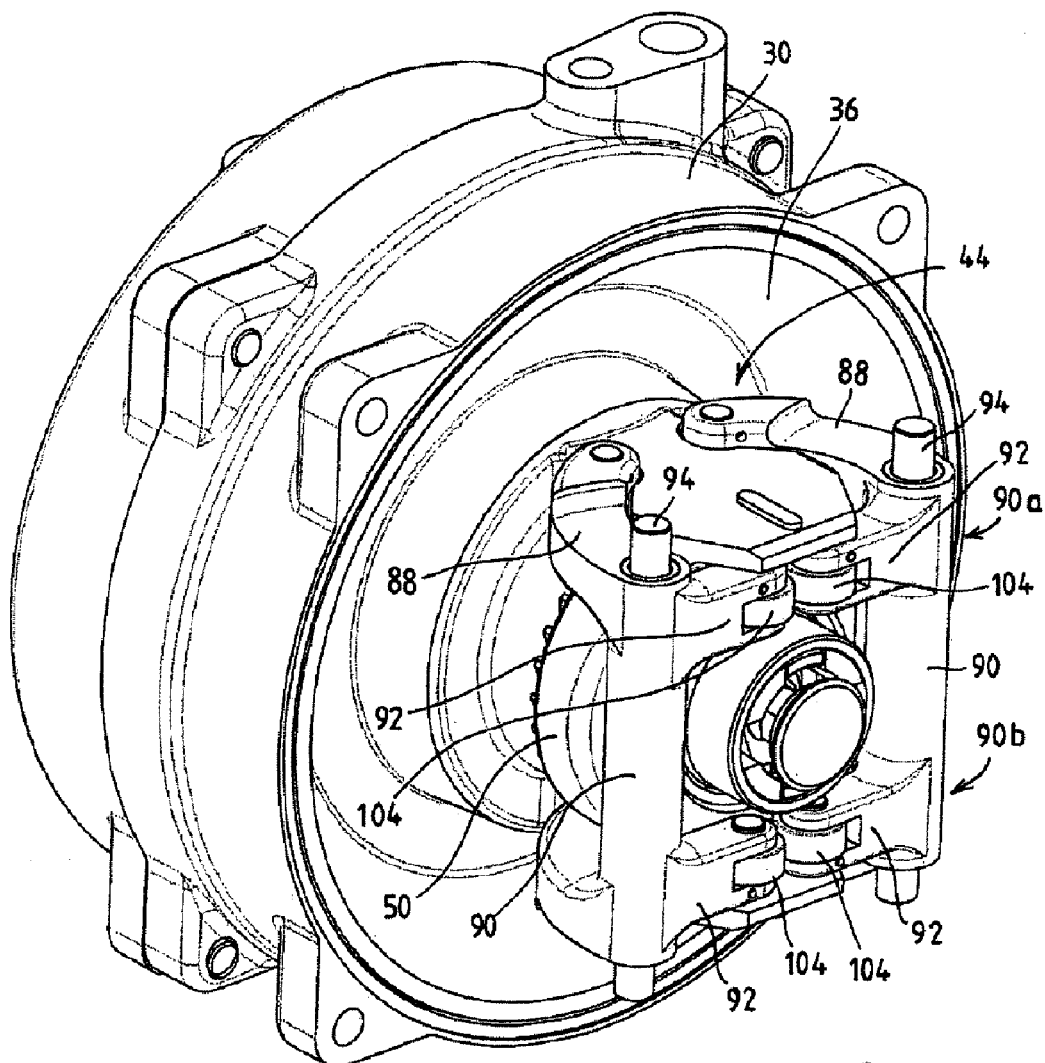
FIG. 8 shows a cut-away perspective illustration of the combination cylinder from FIG. 7.
Figure 9:
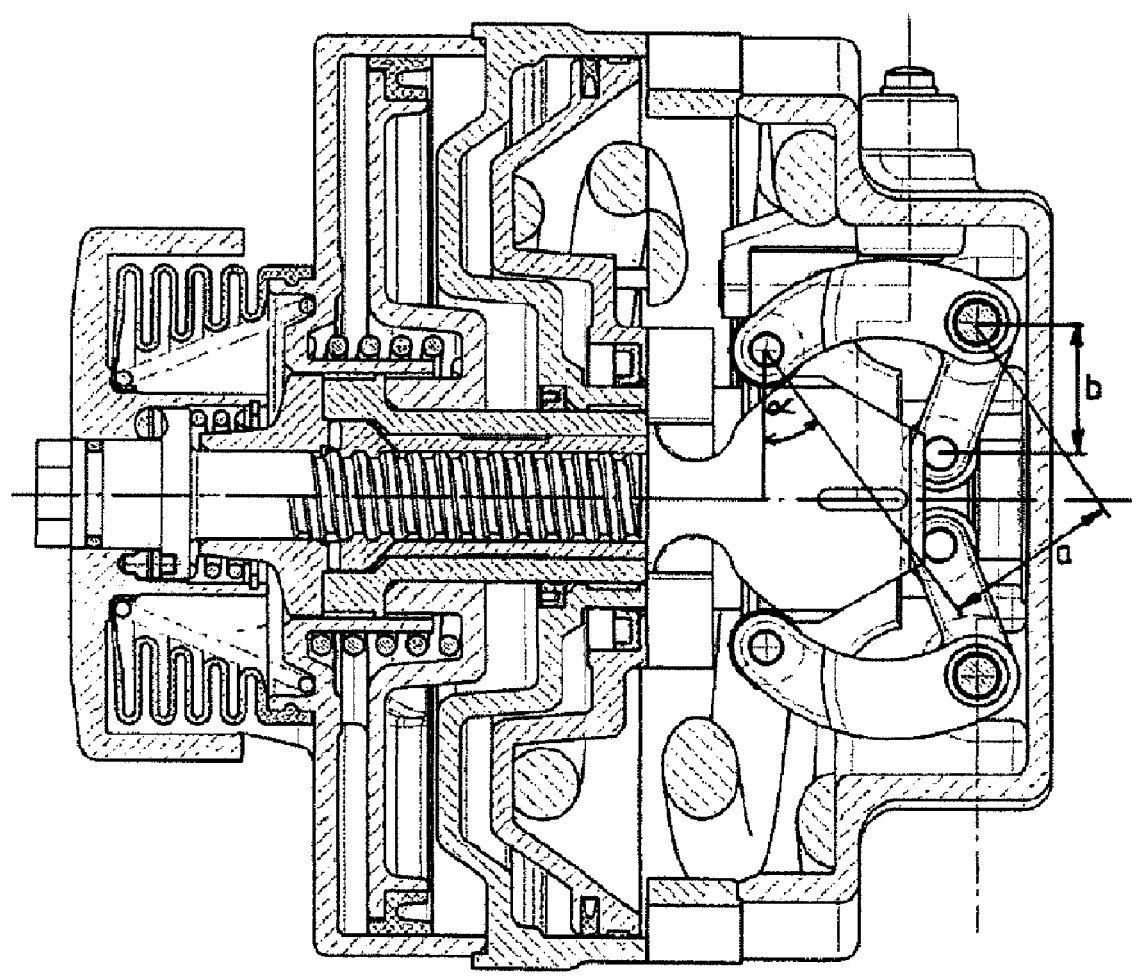
FIG. 9 shows a horizontal longitudinal cross section of the combination cylinder from FIG. 7 in the braking position.

Consequently, if the spring store brake cylinder 30 moves from the released position shown in FIG. 7 into the applied position shown in FIG. 9 in the parking brake situation, then the two wedge contours 86 may be moved concomitantly, as a result of which the one lever arms 88 of the double levers 90 may be moved along the wedge contours 86 and thereby trigger a rotational movement of the double lever 90, as a result of which the other lever arms 92 set the thrust ring 50 in an axial movement in the same direction as the movement of the spring store brake piston 36, as can be seen best from FIG. 8. At the end side, the other lever arms 92 of the double lever 90 may be for example provided with rollers 104 in order to enable rolling on the wedge contours 86 or on the thrust ring 50.

The transmission ratio i may be determined from the lengths a and b of the lever arms 88, 92 of the rotary levers 90 and from the wedge angle α, which may be dependent on the stroke of the spring store brake cylinder 30, of the wedge contours 86 at the respective contact point of the rollers 104 (cf. FIG. 7 and FIG. 9):

$$i = \frac{a}{b \cdot \sin\alpha}$$

The thrust ring 50 which may be rotationally fixedly mounted in the combination cylinder 12 then transmits the axial force acting thereon via the axial thrust bearing 98 to the gearwheel 100, which may be however prevented from rotating relative to the rotationally fixed part 102 in normal operation by the rotational lock 74. The axial force may be then transmitted from the rotationally fixed part 102 of the spindle drive to the service brake piston rod 22.

In normal operation, the pressure pin 78 of the rotational lock 74 may be loaded in the outward direction by a spring such that the pawl 80 engages into the external toothing 82 of the gearwheel 100 and prevents the latter from rotating (FIG. 11). If, for the emergency release of the parking brake, the pressure pin 78 of the rotational lock 74 may be then actuated by being pressed, the pawl 80 tilts about the rotational axis, as a result of which it passes out of engagement at one end side with the external toothing 82 of the gearwheel 100. This has the effect that the gearwheel 100 can rotate freely relative to the rotationally fixed part 102 of the spindle drive by means of the non-self-locking thread 52 until both parts may be free from force in relation to one another. Here, the spring store brake piston 36 moves until it abuts against the base of the spring store brake cylinder 30, and the service brake piston 20 can, driven by the restoring spring 28, move together with the spindle 46 into the released position shown in FIG. 7.

In the third exemplary embodiment of the invention according to FIGS. 12 to 15, those parts which remain the same and have the same action in relation to the preceding example may be denoted by the same reference symbols.

As in the other exemplary embodiments, the spring store brake cylinder 30 and the service brake cylinder 18 may be arranged coaxially. As a store spring 34, provision may be made for example of a conical spring which may be braced by an annular spring store brake piston 36.

Between the spring store brake piston 36 and the service brake piston rod 22 of the service brake cylinder 18, two sliding-block guide mechanisms 106 may be arranged reversed in relation to one another point-symmetrically or in relation to a plane comprising the central axis 32 of the combination cylinder 12, which sliding-block guide mechanisms 106 transmit the force of the store springs 34 to the service brake piston rod 22 of the service brake cylinder 18. A sliding-block guide mechanism 106 may be composed substantially of a sliding-block guide lever 108, whose one end may be rotatably mounted on the cylinder housing 14 and whose other end may be articulatedly connected to the spring store brake piston 36 via a tension lug 110, and of a roller lug 112 which may be rotatably mounted at one end on the thrust ring 50 and which, at the other end, bears a support roller 114 which may be in engagement with a sliding-block guide surface 116 of the sliding-block guide lever 108.

If the spring store brake piston 36 performs a stroke, then the sliding-block guide lever 108 rotates about its bearing point on a bearing block 118 in the cylinder housing. As a result of the rotation of the sliding-block guide lever 108, the angle between the roller lug 112 and the sliding-block guide surface 116 varies, which angle may be normally set to 90 degrees. The roller lug 112 thereupon rotates automatically until the line of force action may be again perpendicular to the tangent of the sliding-block guide surface 116 at the contact point of the support roller 114. In this way, the effective lever arms and consequently also the transmission ratio may be varied.

By means of suitable selection of the sliding-block guide geometry, the position of the bearing points and the lever and lug lengths, it may be possible to obtain a transmission ratio which increases over the piston stroke of the spring store brake piston 36, by means of which the decrease in force of the store spring 34 over the stroke may be compensated or at least reduced.

As in the other exemplary embodiments, the cylinder housing 14 of the combination cylinder 1 may be composed substantially of three parts which may be screwed to one another. The service brake cylinder 18 may be situated in the left-hand cylinder half (FIG. 15), the spring store brake cylinder 30 may be arranged in the right-hand half and may be closed off by the cylinder cover 96. The assemblability of the spring store brake cylinder 30 may be ensured by means of the cylinder cover 96.

The annular service brake piston 20 may be fixedly connected to the service brake piston tube 22, for example by a pressure-tight interference fit, and may be sealed off at the outer diameter by a pressed-on sleeve and at the inner diameter by a shaft sealing ring between the cylinder base and service brake piston tube 22. The service brake piston 20 may be prevented from rotating relative to the housing by at least one guide bolt.

Figure 13:
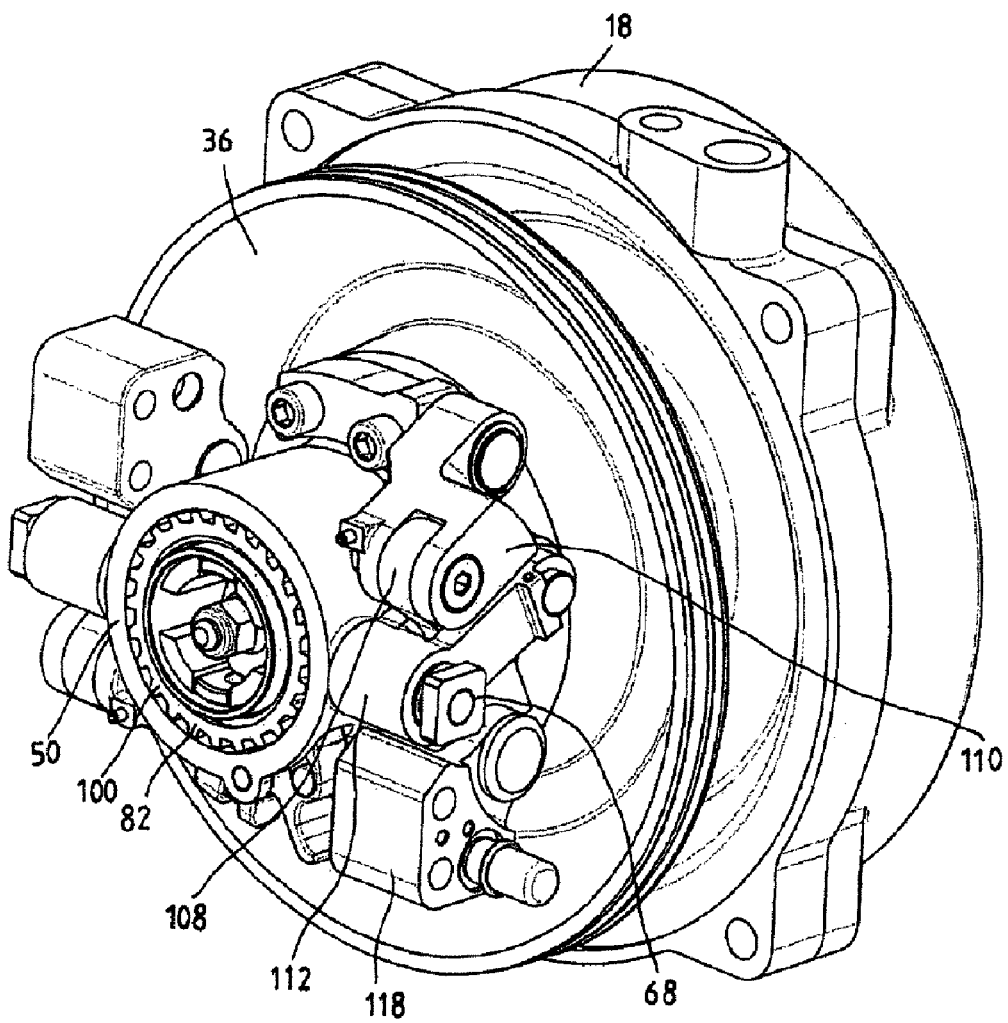
FIG. 13 shows a cut-away perspective illustration of the combination cylinder from FIG. 12.
Figure 14:
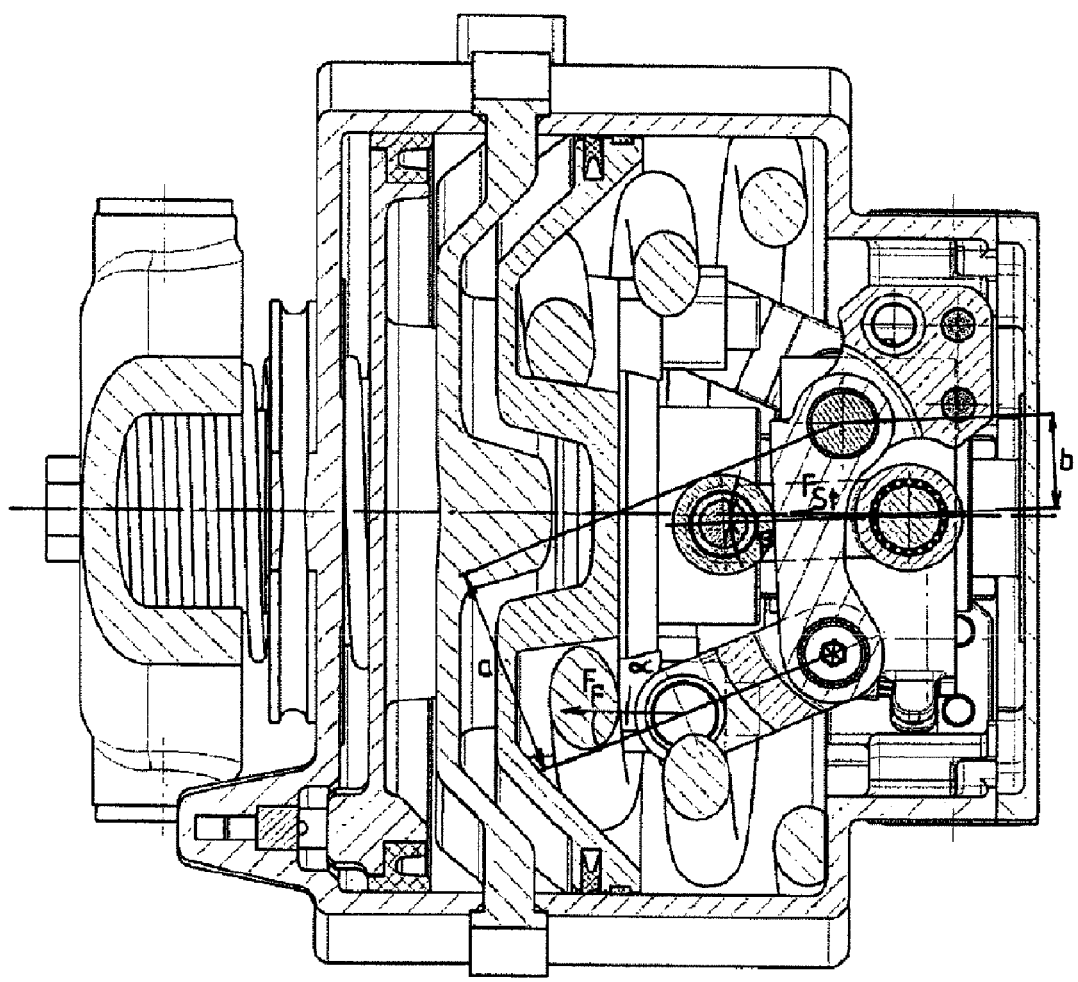
FIG. 14 shows a vertical longitudinal cross section of the combination cylinder from FIG. 12 in the braking position.
Figure 15:
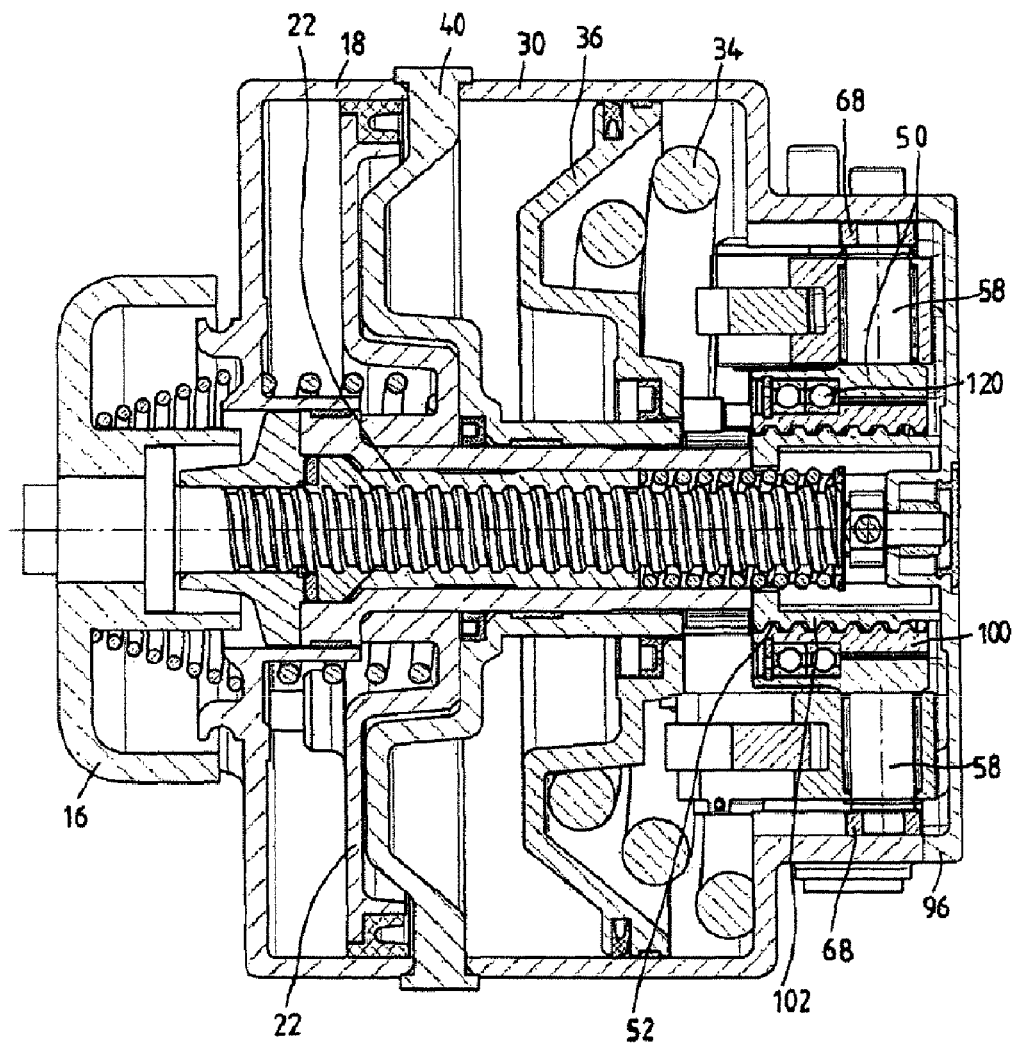
FIG. 15 shows a horizontal central longitudinal cross section of the combination cylinder from FIG. 12 in the released position.

The service brake piston tube 22 may be guided firstly in the service brake cylinder 18 and secondly in the partition 40. The spring store brake cylinder 30 also comprises an outer sealing surface for the spring store brake piston 36 which may be designed as an annular piston, and the spring store brake cylinder 30 has guide surfaces for sliding blocks 68 of the thrust ring 50, which in turn may be held on the ends of two bearing journals 58, which project away perpendicularly to the central axis 32, of the thrust ring 50 (FIG. 13). Air ports (not visible in the sectional illustrations) may be formed in the partition 40 for the spring store brake chamber 42 and the service brake chamber 24. The spring store brake piston 36 may be provided with seals on the inner and outer diameter. Screwed, for example, to the spring store brake piston 36 may be bearing journals for the tension lugs 110 which may be articulatedly connected thereto, with the rotational axes thereof being arranged perpendicular to the central axis 32 of the combination cylinder 1. The store spring 34, which may be designed here for example as a conical spring, may be supported at one side on the cylinder housing 14 and at the other side on the spring store brake piston 36.

The sliding-block guide levers 108 may be articulatedly connected at one side via the tension lugs 110 to the spring store brake piston 36, and may be rotatably mounted at the other side in the bearing blocks 118 which may be fixedly screwed to the cylinder housing 14. The roller lugs 112 which may be mounted on the bearing journals 58 of the thrust ring 50 about an axis perpendicular to the central axis 32 of the combination cylinder 12 have, at their ends pointing away from the bearing journals 58, the support rollers 114 which finally introduce the force from the sliding-block guide levers 108 into the thrust ring 50.

The pawl 80 of the rotational lock 74 of the emergency release device 76 may be mounted on the thrust ring 50 (FIG. 13). The emergency release device 76 again comprises a non-self-locking thread 52 for the mechanical dissipation of the parking brake force if no compressed air may be available for bracing the store spring 34, and also comprises the gearwheel 100 which can be screwed by the non-self-locking thread 52 on the rotationally fixed part 102 of the spindle drive and which may be rotatably mounted by means of for example two rolling bearings 120 in the thrust ring 50, the rotationally fixed part 102 of the spindle drive, which rotationally fixed part engages via two claws into a slot of the service brake piston tube 22 and thereby may be firstly rotationally fixed with the latter and secondly can transmit axial forces to the service brake piston tube 22 in the brake application direction, and the pawl 80 which may be mounted in the thrust ring 50 and which can be placed in engagement with the gearwheel 100. The pawl 80 supports the torque generated in the non-self-locking thread 52 and conducts the torque to the thrust ring 50, which in turn may be supported by the sliding blocks 68 in sliding-block guides of the cylinder housing 14. As in the other exemplary embodiments, during an emergency release actuation, the pawl 80 may be lifted manually out of the external toothing 82 of the gearwheel 100.

For the pneumatic release of the spring store brake cylinder 30 (FIG. 12), the spring store brake chamber 42 may be acted on with pressure, such that the store spring 34 may be preloaded by the spring store brake piston 36.

To apply the spring store brake (FIG. 14), the spring store brake chamber 42 may be deaerated, such that the spring force of the store spring 34 may be supported via the two tension lugs 110, the sliding-block guide lever 108 and the roller lugs 112 on the thrust ring 50. The latter conducts the force via the emergency release device 76 to the service brake piston tube 22 and from there to the spindle yoke 16. Here, the two roller lugs 112 may be automatically set to the angle position, which may be dependent on the piston stroke, of the sliding-block guide levers 108. The roller lugs 112 assume the position in which the line of force action of the roller lugs may be perpendicular to the tangent of the sliding-block guide surfaces 116 at the respective contact point of the support rollers 114. In other words, the bearing point of the roller lug 112, the central point of the support roller 114 and the contact point of the support roller 114 with the sliding-block guide surface 116 lie on a straight line.

In the embodiment illustrated here, the sliding-block guide surface 116 on which the support roller 114 rolls may be planar. Depending on the desired transmission ratio, however, a concave or convex sliding-block guide surface 116 may be also conceivable. In the case of a convex surface, the radius of curvature must be no less than the length of the roller lug 112, in order that a stable equilibrium can be set.

The transmission ratio i, which may be dependent on the stroke of the spring store brake piston 36, can be calculated from the lengths a and b of the effective lever arms and the angles α and β (FIGS. 12 and 14):

$$i = \frac{a \cdot \cos\beta}{b \cdot \cos\alpha}$$

The force $F_{St}$ on the thrust ring 50 or on the spindle yoke 16 may be then defined as follows:

$$F_{St} = i \cdot F_F$$

If no compressed air may be available for releasing the applied spring store brake, for example as a result of leakage, then the spring store brake can be released by manually actuating the emergency release device 76. For this purpose, by pressing the emergency release actuating means, the pawl 80 which may be mounted in the thrust ring 50 may be pushed out of the toothing 82 of the gearwheel 100, as a result of which the rotational locking between the rotationally fixed part 102 of the spindle drive and the gearwheel 100 may be eliminated. Since the thread 52 between the two parts may be not self-locking, the gearwheel 100 may be screwed on the rotationally fixed part 102 until both parts may be free from force in relation to one another. Here, the spring store brake piston 36 passes into the released position, and the service brake piston 20 itself can also, driven by the restoring spring 28, assume the release position together with the rotationally fixed part 102.

LIST OF REFERENCE SYMBOLS

1 Brake caliper
2 Brake caliper lever
4 Brake caliper lever
6 Tension rod
8 Brake pad
10 Brake disk
12 Combination cylinder
14 Housing
16 Spindle yoke
18 Service brake cylinder
20 Service brake piston
22 Service brake piston rod
24 Service brake chamber
26 Bolt
28 Restoring spring
30 Spring store brake cylinder
32 Central axis
34 Store spring
36 Spring store brake piston
38 Spring chamber
40 Partition
42 Spring store brake chamber
44 Gearing
46 Spindle
48 Axial thrust bearing
50 Thrust ring
52 Thread
54 Angle lever
56 Support surface
58 Bearing journal
60 Lever arm
62 Lever arm
64 Tension lug
66 Support roller
68 Sliding body
70 Sliding-block guides
72 Guide bolt
74 Rotational lock
76 Emergency release device 78 Pressure pin
80 Pawl
82 External toothing
84 Locking pin
86 Wedge contour
88 Lever arm
90 Lever
90a Upper lever
90b Lower lever
92 Lever arm
94 Lever rotational axle
96 Cylinder cover
98 Axial thrust bearing
100 Rotatable part of the spindle drive
102 Rotationally fixed part of the spindle drive
104 Rollers
106 Sliding-block guide mechanism
108 Sliding-block guide lever
110 Tension lug
112 Roller lug
114 Support roller
116 Sliding-block guide surface
118 Bearing block
120 Rolling bearing

The invention claimed is:

1. A combination cylinder comprising:
  a service brake cylinder as an active service brake with at least one pressure-medium-actuated service brake piston that actuates a brake mechanism via a service brake piston rod; and
  a spring store brake cylinder as a passive parking brake with a spring store brake piston which is actuated by pressure medium counter to the action of at least one store spring with the spring store brake piston transmitting the force of the at least one store spring to the service brake piston rod in the parking braking situation, wherein:
    a) the parking brake force generated by the spring store brake piston is optionally introduced into a rotationally fixedly mounted thrust ring which can be actuated coaxially with respect to a central axis of the combination cylinder and which exerts axial forces on a spindle drive, wherein the spindle drive includes said thrust ring, and an axial force transmission is provided between the spindle drive and the service brake piston rod, with
    b) the thrust ring of the spindle drive being mounted in a rotationally fixed manner and another part of the spindle drive being rotatably mounted coaxially with respect to a central axis of the combination cylinder, and the rotational movement of the thrust ring of the spindle drive is optionally blocked by a releasable rotational lock for axial force transmission between the rotationally fixed thrust ring and the rotatable part and optionally unblocked to eliminate the axial force transmission, and with
    c) the rotational lock comprising a pawl which is optionally engaged into an external toothing of the rotatable part of the spindle drive and which is rotatably mounted on the thrust ring, and the releasable rotational lock being part of an emergency release device for the emergency release of the parking brake, and
    d) the releasable rotational lock being blocked in normal operation and being released for the emergency release of the parking brake,
  the combination cylinder further comprising a force-transmitting gearing being positioned relative to the central axis to compensate for torques about an axis perpendicular to the central axis.

2. The combination cylinder of claim 1, wherein a thread between the rotatable part of the spindle drive and the rotationally fixed thrust ring of the spindle drive is a non-self-locking thread.

3. The combination cylinder of claim 1, wherein the pawl is designed to be pivotable about an axis parallel to the central axis of the combination cylinder, and is optionally lifted out of the external toothing of the rotatable part of the spindle drive by pressing a pressure pin which is movably mounted in the combination cylinder.

4. The combination cylinder of claim 1, wherein when the rotational lock is released for the emergency release of the parking brake, the rotatable part of the spindle drive is screwed relative to the rotationally fixed thrust ring of the spindle drive by a thread, with the spring store brake piston moving until it abuts against a base of the spring store brake cylinder, and with the service brake piston, driven by a restoring spring, moving together with the rotatable part of the spindle drive into a released position.

5. The combination cylinder of claim 1, wherein, during the emergency release of the parking brake, the pawl is optionally held in the lifted-out position by the engagement of a locking pin.

6. The combination cylinder of claim 5, wherein the spring store brake piston is optionally forced into the release position by the pressurization of a spring store brake chamber, with the thrust ring being driven along and the locking pin lifted out, as a result of which the pawl engages into the external toothing of the rotatable part of the spindle drive and the rotational lock thereby locks.

7. The combination cylinder of claim 1, wherein the parking brake force is optionally introduced into the thrust ring by the force-transmitting gearing.

8. The combination cylinder of claim 7, wherein the force-transmitting gearing is designed such that the movements of the spring store brake piston and of the service brake piston rod are coaxial and, to realize an approximately constant store spring force on the service brake piston rod over the entire stroke of the spring store brake piston, the force transmission ratio of the gearing becomes greater with progressive stroke of the spring store brake piston.

9. The combination cylinder of claim 8, further comprising at least one bearing journal which is arranged perpendicular to the central axis of the combination cylinder and is formed on the thrust ring, on which the at least one bearing journal is pivotably mounted at least one angle lever which is articulatedly connected with its one end to the spring store brake piston and with its other end to a fixed support surface of the combination cylinder in such a way that, during an actuation of the spring store brake piston in the parking braking situation, a rotation of the supported at least one angle lever about the at least one bearing journal and therefore an actuation of the thrust ring in the same direction are triggered.

10. The combination cylinder of claim 9, wherein the at least one angle lever comprises two angle levers that are provided and which are rotatably mounted on bearing journals, which extend outward perpendicular to the central axis of the combination cylinder, of the thrust ring, which angle levers are arranged reversed in relation to one another with respect to a plane comprising the central axis of the combination cylinder.

11. The combination cylinder of claim 10, wherein a lever arm of one of the at least two angle levers is connected to the spring store brake piston via a doubly articulatedly connected tension lug.

12. The combination cylinder of claim 11, wherein another lever arm of the at least two angle levers is supported by a support roller which is configured to roll on a fixed support surface.

13. The combination cylinder of claim 12, wherein the at least one bearing journal comprises bearing journals of the thrust ring bear sliding bodies at the end sides, which sliding bodies are guided in sliding-block guides which extend in the direction of the central axis of the combination cylinder.

14. The combination cylinder of claim 13, wherein a support surface for the at least one angle lever is formed on a partition between the spring store brake cylinder and the service brake cylinder.

15. The combination cylinder of claim 14, wherein the partition forms a support surface for the at least one store spring of the spring store brake cylinder.

16. A brake caliper unit of a disk brake of a rail vehicle comprising at least one combination cylinder as claimed in claim 1.

* * * * *